United States Patent
Kawaguchi et al.

(10) Patent No.: US 11,284,014 B2
(45) Date of Patent: Mar. 22, 2022

(54) IMAGE PROCESSING APPARATUS, IMAGE CAPTURING SYSTEM, IMAGE PROCESSING METHOD, AND RECORDING MEDIUM

(71) Applicant: Ricoh Company, Ltd., Tokyo (JP)

(72) Inventors: Keiichi Kawaguchi, Kanagawa (JP); Takahiro Asai, Kanagawa (JP); Kazuhiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/648,150

(22) PCT Filed: Oct. 24, 2018

(86) PCT No.: PCT/JP2018/039479
§ 371 (c)(1),
(2) Date: Mar. 17, 2020

(87) PCT Pub. No.: WO2019/082925
PCT Pub. Date: May 2, 2019

(65) Prior Publication Data
US 2020/0280669 A1 Sep. 3, 2020

(30) Foreign Application Priority Data
Oct. 27, 2017 (JP) .............................. JP2017-208676

(51) Int. Cl.
*H04N 5/235* (2006.01)
*G06T 5/00* (2006.01)
(Continued)

(52) U.S. Cl.
CPC .......... *H04N 5/2355* (2013.01); *G06T 5/009* (2013.01); *G06T 5/50* (2013.01); *H04N 5/2258* (2013.01);
(Continued)

(58) Field of Classification Search
None
See application file for complete search history.

(56) References Cited

U.S. PATENT DOCUMENTS

2010/0091119 A1* 4/2010 Lee .................. H04N 5/235
348/208.4
2012/0262600 A1* 10/2012 Velarde .................. H04N 9/735
348/223.1
(Continued)

FOREIGN PATENT DOCUMENTS

EP 2 627 071 A1 8/2013
JP 2014-135775 7/2014
(Continued)

OTHER PUBLICATIONS

International Search Report and Written Opinion dated Jan. 31, 2019 in PCT/JP2018/039479 filed on Oct. 24, 2018.
(Continued)

*Primary Examiner* — James M Hannett
(74) *Attorney, Agent, or Firm* — Xsensus LLP

(57) ABSTRACT

An image processing apparatus includes: an image acquisition unit to obtain a plurality of images that have been captured under different exposure conditions; an acceptance unit to receive designation of an area in a first image, the first image being one of the plurality of images; a brightness characteristics acquisition unit to obtain a brightness characteristic value of the designated area in the first image; and a combining unit to: determine a combining condition used for combining the first image and a second image according to the brightness characteristic value, the second image being any one of the plurality of images other than the first image, and combine the first image and the second image based on the combining condition to correct brightness of the designated area for display.

13 Claims, 34 Drawing Sheets

(51) Int. Cl.
  *G06T 5/50* (2006.01)
  *H04N 5/225* (2006.01)
  *H04N 5/247* (2006.01)
(52) U.S. Cl.
  CPC ........... *H04N 5/2356* (2013.01); *H04N 5/247* (2013.01); *G06T 2207/10144* (2013.01); *G06T 2207/20221* (2013.01)

(56) References Cited

U.S. PATENT DOCUMENTS

| | | | |
|---|---|---|---|
| 2013/0016253 A1* | 1/2013 | Kobayashi | H04N 5/357 348/239 |
| 2013/0229546 A1 | 9/2013 | Furumura et al. | |
| 2014/0240346 A1 | 8/2014 | Kawaguchi | |
| 2015/0264273 A1* | 9/2015 | Feder | H04N 5/37452 348/239 |
| 2016/0050369 A1 | 2/2016 | Takenaka et al. | |
| 2016/0212336 A1 | 7/2016 | Takenaka et al. | |
| 2017/0332060 A1* | 11/2017 | Chan | H04N 5/23218 |
| 2018/0041682 A1* | 2/2018 | Zhang | H04N 5/235 |
| 2018/0006100 A1 | 3/2018 | Keiichi et al. | |
| 2018/0181358 A1 | 6/2018 | Asai et al. | |
| 2018/0182065 A1 | 6/2018 | Yoshida et al. | |
| 2018/0184001 A1 | 6/2018 | Yoshida et al. | |
| 2018/0270417 A1 | 9/2018 | Suitoh et al. | |
| 2019/0306399 A1* | 10/2019 | Fujinami | G06T 5/50 |

FOREIGN PATENT DOCUMENTS

| | | |
|---|---|---|
| JP | 5745134 A | 5/2015 |
| JP | 2017-38165 A | 2/2017 |

OTHER PUBLICATIONS

Japanese Office Action dated Nov. 9, 2021, in corresponding Japanese Patent Application 2017-208676.

* cited by examiner

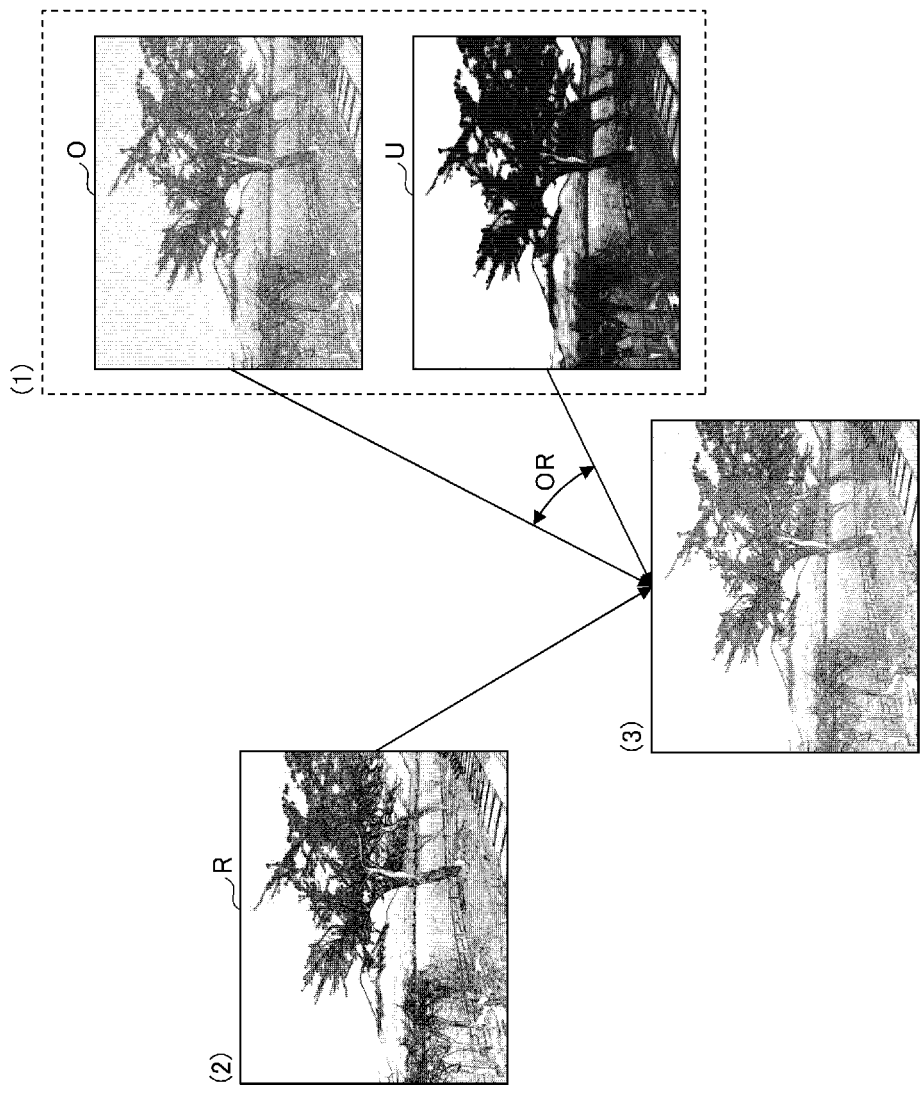

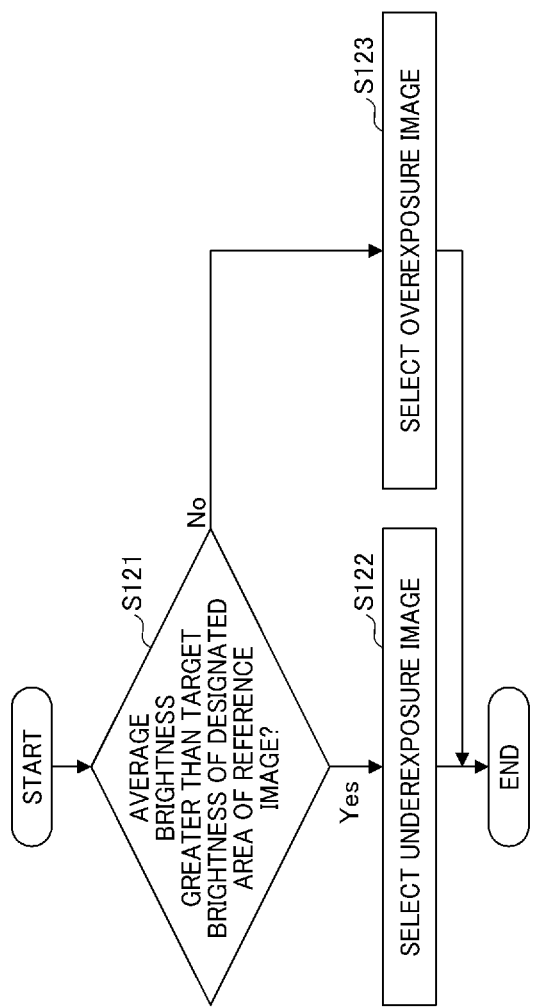

HEMISPHERICAL IMAGE (FRONT)

HEMISPHERICAL IMAGE (BACK)

CAPTURED IMAGE (EQUIRECTANGULAR PROJECTION IMAGE EC)

FIG. 14A
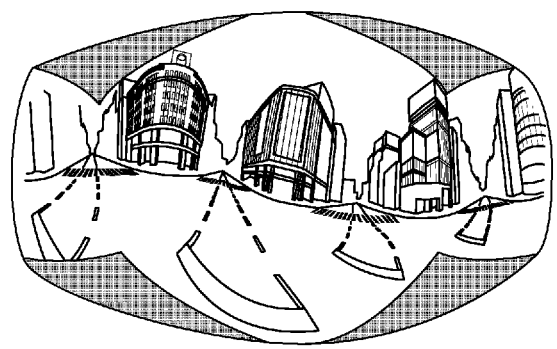
EQUIRECTANGULAR PROJECTION IMAGE EC
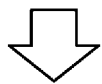
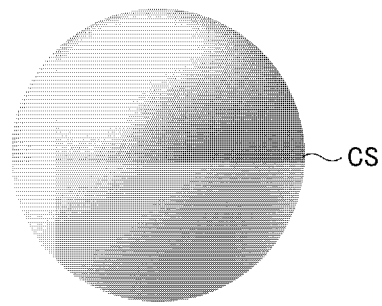

SPHERICAL IMAGE CE

PREDETERMINED-AREA IMAGE Q

IMAGE PROCESSING APPARATUS, IMAGE CAPTURING SYSTEM, IMAGE PROCESSING METHOD, AND RECORDING MEDIUM

TECHNICAL FIELD

The present invention relates to an image processing apparatus, an image capturing system, an image processing method, and a recording medium.

BACKGROUND ART

The image capturing device provided with an imaging element, such as a digital camera, performs photoelectric conversion to convert light into an electric signal to obtain an image with brightness information. However, the imaging element such as a complementary metal oxide semiconductor (CMOS) has a narrower dynamic range than that of a human eye. This may result in degradation in image quality, causing the image to have a darkened portion or a white spot.

In recent years, an image capturing device capable of obtaining a spherical image, provided with a wide-angle lens, is known. For the image taken with such the image capturing device, since the angle of view is large, there is a high possibility that the image includes bright areas and dark areas, causing a large difference in brightness in one image. Accordingly, the captured image tends to suffer from degradation in image quality, for example, due to darkened portion or white spots.

In view of this, there is a technology in which a plurality of images with different exposure conditions are captured, and at least two of those images are combined to obtain one image with a greater dynamic range, as described in, for example, Patent Document 1. Patent Document 1 discloses a technique in which, in response to a user designating an area in an image, brightness characteristics of the designated area is obtained. Based on the obtained brightness characteristics, a plurality of images that are taken under different exposure conditions are combined to generate an image for display to the user.

CITATION LIST

Patent Literature

[PTL 1]
Japanese Patent Registration No. 5745134

SUMMARY OF INVENTION

Technical Problem

Patent Document 1, however, does not describe how an intermediate exposure level of the combined image should be determined. That is, the intermediate exposure level in Patent Document 1 is merely a value between the target exposure level and the current exposure level. There is no guarantee that the intermediate exposure level, which is just a value between the target exposure level and the current exposure level, is an adequate exposure level of the combined image.

Solution to Problem

Example embodiments of the present invention include an image processing apparatus includes: an image acquisition unit to obtain a plurality of images that have been captured under different exposure conditions; an acceptance unit to receive designation of an area in a first image, the first image being one of the plurality of images; a brightness characteristics acquisition unit to obtain a brightness characteristic value of the designated area in the first image; and a combining unit to determine a combining condition used for combining the first image and a second image according to the brightness characteristic value, the second image being any one of the plurality of images other than the first image, and combine the first image and the second image based on the combining condition to correct brightness of the designated area for display.

Example embodiments of the present invention include an image capturing system including the image processing apparatus, an image processing method, and a recording medium storing an image processing control program.

Advantageous Effects of Invention

Accordingly, the combined image to be displayed to a user has adequate exposure.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 1 is a schematic diagram illustrating operation of combining images, performed by an image processing apparatus, according to an embodiment.

FIG. 10 is a flowchart illustrating processing to determine a planar image to be combined with a reference image, performed by the image and audio processing unit of FIG. 7, according to the first embodiment.

FIG. 14A and FIG. 14B are views respectively illustrating the image in equirectangular projection covering a surface of a sphere, and a spherical image, according to an embodiment.

DESCRIPTION OF EMBODIMENTS

Figure 2A:
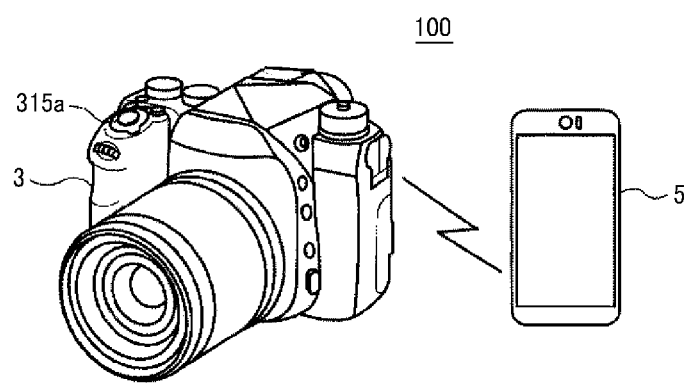
FIGS. 2A, 2B, and 2C are schematic diagrams each illustrating an example configuration of an image capturing system according to an embodiment.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Referring to the drawings, one or more embodiments of the present invention are described.

In one or more embodiments described below, an image processing apparatus displays, on a display, an image of a partial area in an image that has been captured. In displaying such image, at least the partial area of the image is adjusted to have adequate exposure level, using a plurality of images that have been captured at the same position (location) but with different exposure conditions.

Referring to FIG. 1, example operation performed by an image processing apparatus is described. FIG. 1 is a schematic diagram illustrating combining two images captured by a general-purpose (generic) image capturing device.

(1) The generic image capturing device captures a plurality of images directed to the same object, at the same position but with different exposure conditions. Specifically, the generic image capturing device captures an image such that the entire image is captured with adequate exposure, as a reference image. The generic image capturing device further captures an image with exposure higher than that of the reference image, and an image with exposure lower than that of the reference image. Here, the image with adequate exposure is referred to as a reference image R as illustrated in FIG. 1. The image with higher exposure is referred to as an overexposed image O. The image with lower exposure is referred to as an underexposed image U.

(2) As a user operates the image processing apparatus, such as a smart phone, to designate a partial area of the reference image R, the image processing apparatus obtains the brightness characteristic value, such as the average brightness value, of the designated area of the reference image R, and compares the obtained brightness characteristic value with the target brightness value. When the designated area of the reference image R has the brightness characteristic value greater than the target brightness value, the image processing apparatus selects the underexposed image U. When the designated area of the reference image R has the brightness characteristics value less than the target brightness value, the image processing apparatus selects the overexposed image O.

(3) The image processing apparatus combines the reference image R with selected one of the underexposed image U and the overexposed image O, at a ratio determined based on a comparison result, to generate a combined image as illustrated in FIG. 1. Accordingly, the designated area in the reference image R is displayed with adequate exposure, i.e., adequate brightness level.

In one or more embodiments described below, the generic image capturing device captures a plurality of images at the same position (location) but with different exposure conditions. In response to designation of a partial area in one of the plurality of images (first image), the image processing apparatus selects other image to be combined (second image), and further determines a condition for combining the first image and the second image, based on brightness characteristics of the designated area. For example, the condition for combining may be a ratio indicating how much of the first image and how much of the second image are combined, which is calculated based on the brightness characteristics of the designated area. The image processing apparatus combines the first image with the second image under the determined condition to generate an image having the designated area with adequate brightness.

Further, in one or more embodiments described below, the image processing apparatus may obtain a plurality of images, taken with a special-purpose (special) image capturing device, and performs processing to combine in a substantially similar manner.

In this disclosure, it is assumed that the exposure condition(s) correspond to various settings of the image capturing device that affect brightness of the captured image data. The designated area is a part of the image or entire image, designated by a user to be displayed on a display area of the display. In this disclosure, the designated area may be referred to as a viewable area, display area, or a predetermined area.

The brightness characteristics are any characteristics of the image related to brightness. The brightness characteristics may be referred to as, for example, brightness, brightness or luminance information, and exposure state.

The condition for combining, is any condition to be used in combining at least two of the plurality of images taken with different exposure conditions. For example, in case the first image is to be combined with the second image, the condition for combining indicates how much of the first image and how much of the second image are to be combined, such as a ratio between the first image and the second image used in combining. In another example, the condition for combining may indicate a method for combining the images. In another example, the condition for combining may indicate the degree of correcting any image to be combined.

<Overview of Image Capturing System>

Figure 2B:
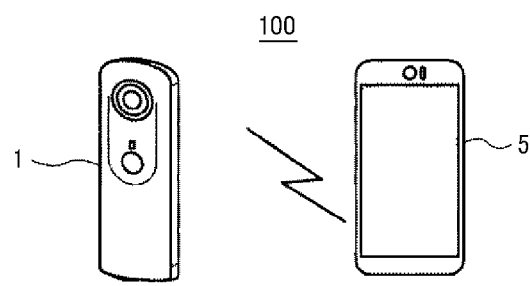
Figure 2C:
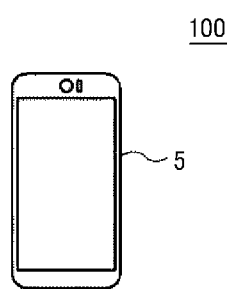

Referring to FIGS. 2A, 2B, and 2C, an overview of an image capturing system 100 is described according to examples of the embodiment. FIGS. 2A, 2B, and 2C are schematic diagrams each illustrating a configuration of the image capturing system 100 according to an example.

As illustrated in FIG. 2A, in one example, the image capturing system 100 includes a generic image capturing device 3 and a smart phone 5.

The smart phone 5 is one example of an information processing apparatus that communicates wirelessly with the generic image capturing device 3 using near-distance (short-distance) wireless communication, such as Wireless Fidelity (Wi-Fi), Bluetooth (Registered Trademark), and Near Field Communication (NFC). The smart phone 5 displays a planar image captured by the generic image capturing device 3, on a display 517 provided for the smart phone 5 as described below.

The smart phone 5 may communicate with the generic image capturing device 3, without using the near-distance wireless communication, but using wired communication such as a cable. The smart phone 5 is an example of the information processing apparatus capable of processing images being captured, and is provided with a communication function. Other examples of the information processing apparatus include, but not limited to, a tablet personal computer (PC), a note PC, and a desktop PC. Since the smart phone 5 is provided with the display, the smart phone 5 in this example may also be referred to as a display apparatus. However, the smart phone 5, which is an example of the image processing apparatus, may display any information on an external display.

The generic image capturing device 3 is a digital single-lens reflex camera, however, it may be implemented as a compact digital camera. The generic image capturing device 3 is provided with a shutter button 315a, which is a part of an operation unit 315 described below. The generic image capturing device 3 transmits a planar image captured by the generic image capturing device 3 to the smart phone 5, by wireless communication or wired communication.

FIG. 2B is a schematic diagram illustrating a configuration of the image capturing system 100 according to another example. As illustrated in FIG. 2B, the image capturing system 100 of this example includes a special image capturing device 1 and a smart phone 5.

The special image capturing device 1 is a special digital camera, which captures an image of an object or surroundings such as scenery to obtain two hemispherical images, from which a spherical (panoramic) image is generated, as described below in a second embodiment. The smart phone 5 is substantially the same in hardware as the smart phone 5 described above referring to FIG. 2A.

FIG. 2C illustrates a configuration of the image capturing system 100 according to another example. In one example, the smart phone 5 captures the planar image and applies image processing to the captured planar image, to function as the image capturing system 100 of FIG. 2A. In another example, the smart phone 5 captures the spherical image and applies image processing to the captured spherical image, to function as the image capturing system 100 of FIG. 2B. The smart phone 5 captures a planar image or a spherical image using an image capturing unit. The image capturing unit of the smart phone 5 may be built in or externally provided.

<Hardware Configuration>

Figure 3:
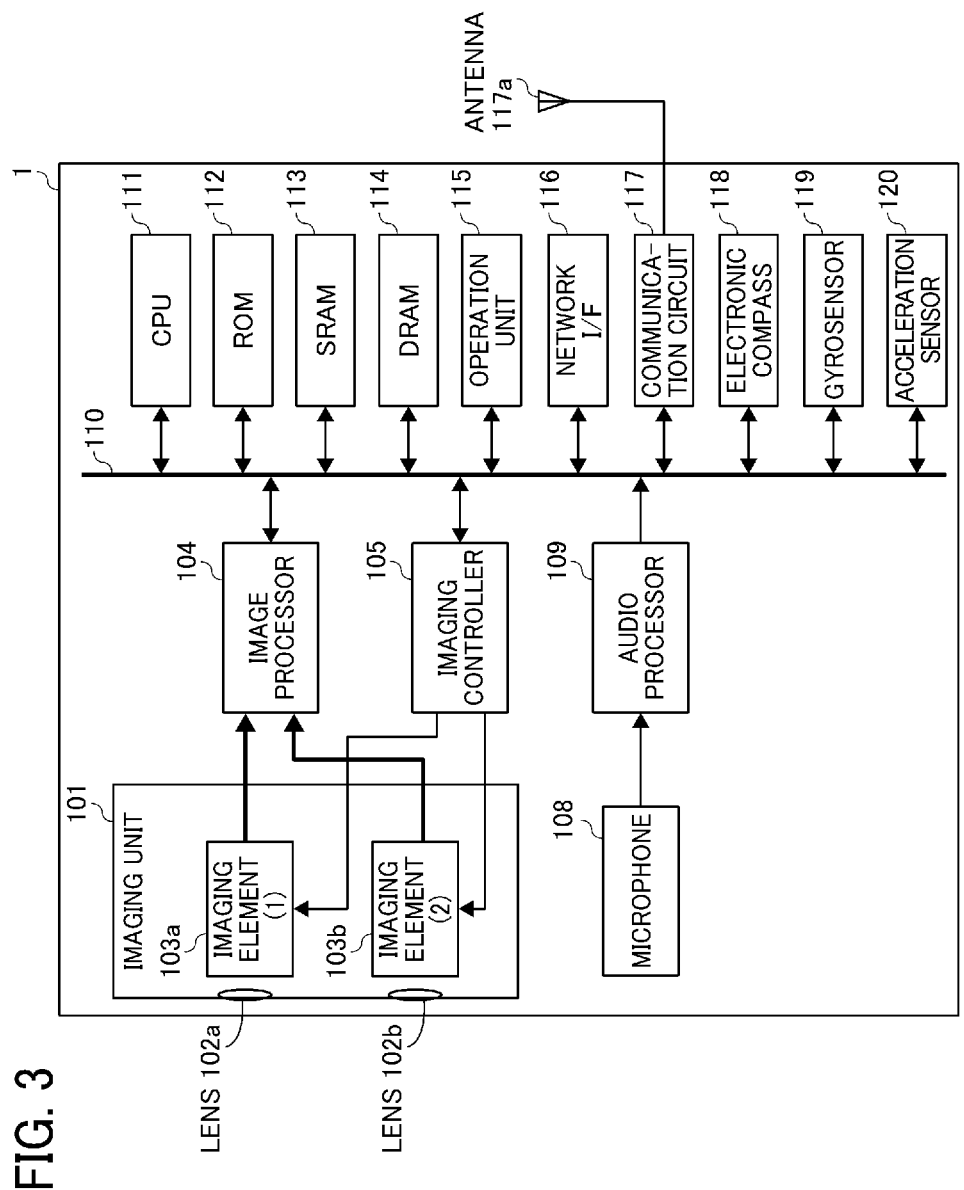
FIG. 3 is a schematic block diagram illustrating a hardware configuration of a special-purpose (special) image capturing device in the image capturing system of FIG. 2B, according to an embodiment.
Figure 4:
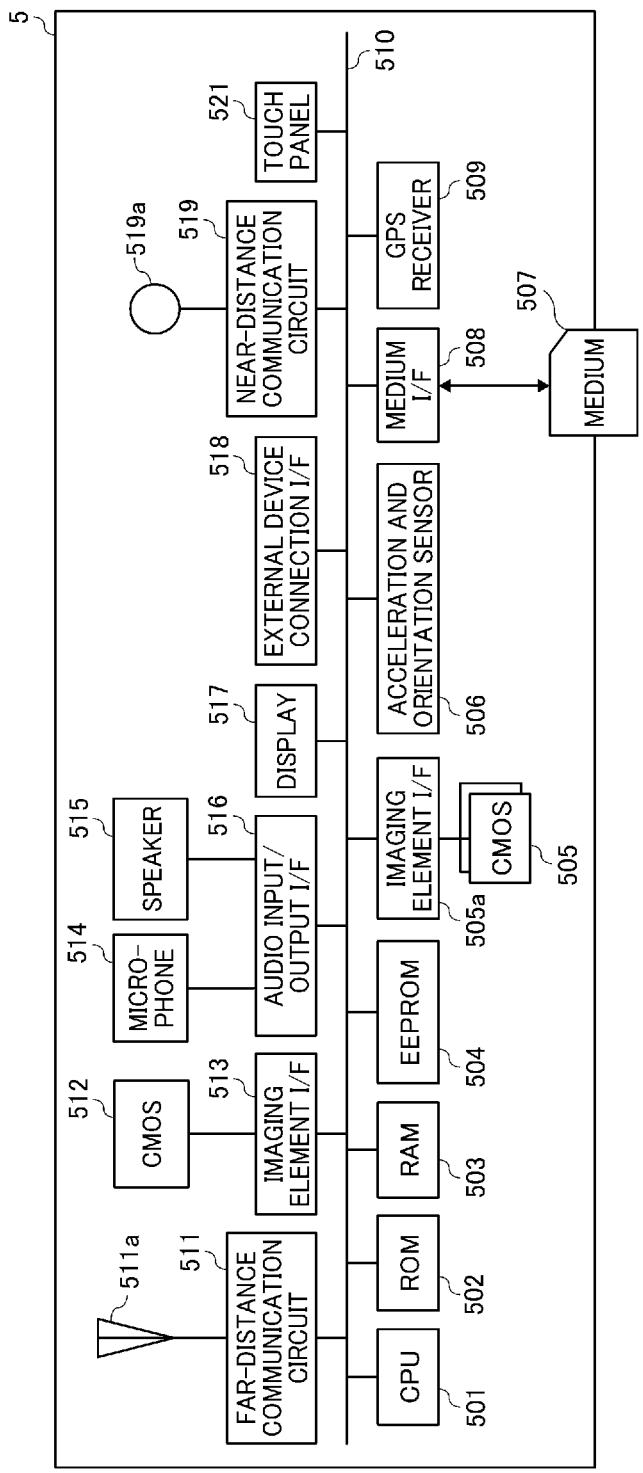
FIG. 4 is a schematic block diagram illustrating a hardware configuration of a smart phone in the image capturing system of any one of FIGS. 2A to 2C, according to an embodiment.
Figure 5:
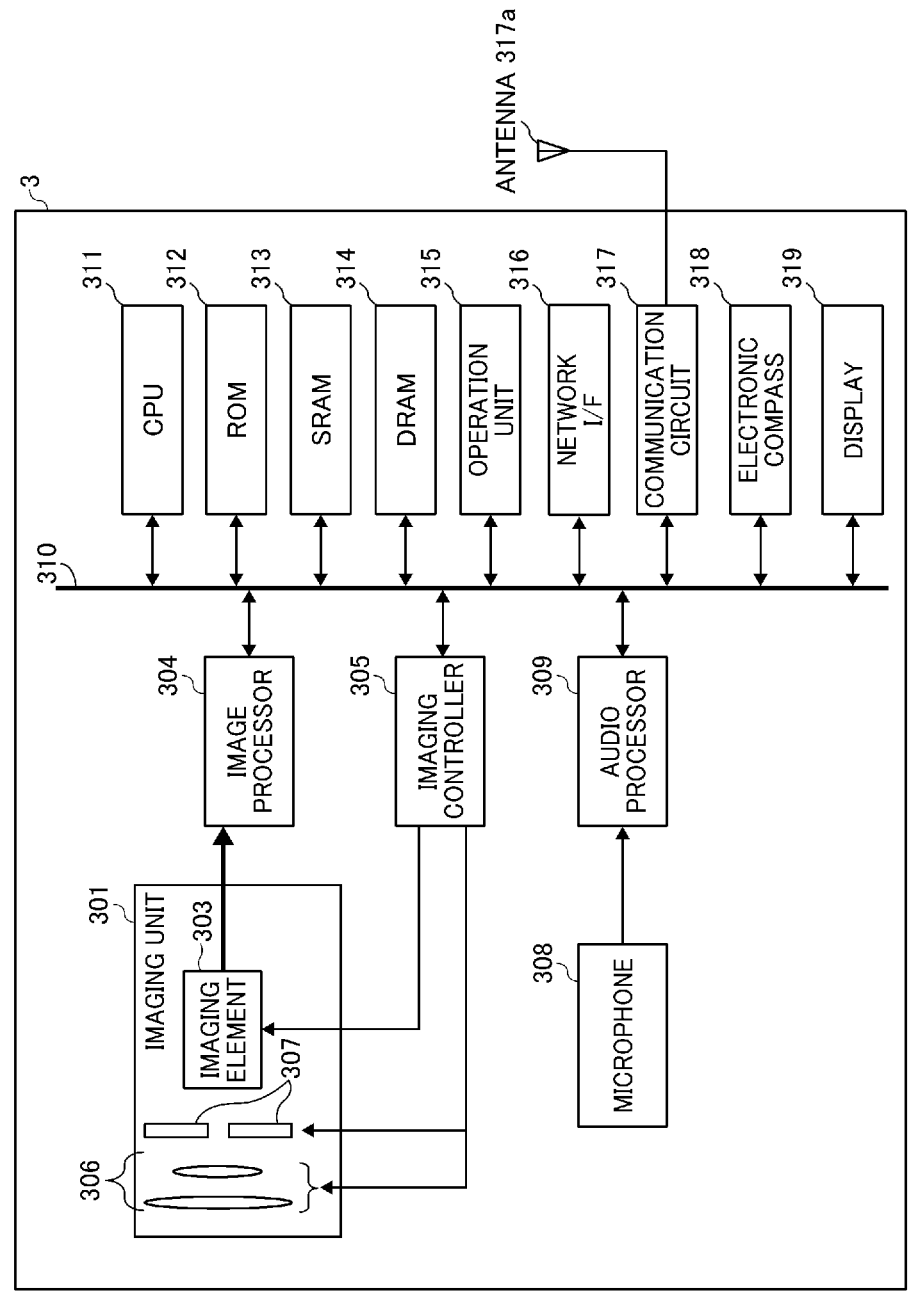
FIG. 5 is a schematic block diagram illustrating a hardware configuration of the generic image capturing device in the image capturing system of FIG. 2A, according to an embodiment.

Next, referring to FIGS. 3 to 5, hardware configurations of the special image capturing device 1, generic image capturing device 3, and smart phone 5 are described according to the embodiment.

<Hardware Configuration of Special Image Capturing Device>

First, referring to FIG. 3 a hardware configuration of the special image capturing device 1 is described according to the embodiment. FIG. 3 illustrates the hardware configuration of the special image capturing device 1. The following describes a case in which the special image capturing device 1 is a full-view spherical (omnidirectional) image capturing device having two imaging elements. However, the special image capturing device 1 may include any suitable number of imaging elements, providing that it includes at least two imaging elements. In addition, the special image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the special image capturing device 1.

As illustrated in FIG. 3, the special image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, and an acceleration sensor 120.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each include an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, and the electronic compass 118 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as described below.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the special image capturing device 1 is capable of displaying a preview image on a display (e.g., the display 517 of the smart phone 5) or displaying a moving image (movie). In case of displaying movie, the image data are continuously output from the imaging elements 103a and 103h at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the special image capturing device 1 does not include a display in this embodiment, the special image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the special image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the special image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the special image capturing device 1 by near-distance wireless communication such as Wi-Fi, NFC, and Bluetooth. The communication circuit 117 is also capable of transmitting the data of equirectangular projection image to the external device such as the smart phone 5.

The electronic compass 118 calculates an orientation of the special image capturing device 1 from the Earth's magnetism to output orientation information. This orientation information is an example of related information, which is metadata described in compliance with Exif. This information is used for image processing such as image correction of captured images. Further, the related information also includes a date and time when the image is captured by the special image capturing device 1, and a size of the image data.

The gyro sensor detects the change in tilt of the special image capturing device 1 (roll, pitch, yaw), for example, due to movement of the special image capturing device 1. The change in angle is one example of related information (metadata) described in compliance with Exif. This information is used for image processing such as image correction of captured images.

The acceleration sensor 120 detects acceleration in three axial directions. The position (an angle with respect to the direction of gravity) of the special image capturing device 1 is determined, based on the detected acceleration. With gyro sensor 119 and the acceleration sensor 120, the special image capturing device 1 is able to correct images with high accuracy.

<Hardware Configuration of Smart Phone>

Referring to FIG. 4, a hardware configuration of the smart phone 5 is described according to the embodiment. FIG. 4 illustrates a hardware configuration of the smart phone 5. As illustrated in FIG. 4, the smart phone 5 includes a CPU 501, a ROM 502, a RAM 503, an EEPROM 504, an imaging element I/F 505a, an acceleration and orientation sensor 506, a medium I/F 508, and a GPS receiver 509.

The CPU 501 controls entire operation of the smart phone 5. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. A Complementary Metal Oxide Semiconductor (CMOS) sensor 505, which is connected to the imaging element I/F 505a, captures an object (for example, the user operating the smart phone 5) under control of the CPU 501 to obtain captured image data. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The smart phone 5 further includes a far-distance communication circuit 511, an antenna 511a for the far-distance communication circuit 511, a CMOS sensor 512, an imaging element I/F 513, a microphone 514, a speaker 515, an audio input/output I/F 516, a display 517, an external device connection I/F 518, a near-distance (short-distance) communication circuit 519, an antenna 519a for the near-distance communication circuit 519, and a touch panel 521.

The far-distance communication circuit 511 is a circuit that communicates with other device through the communication network. The imaging element I/F 513 is a circuit that controls driving of the CMOS sensor 512. The CMOS sensor 512 is connected to the imaging element I/F 513. The CMOS sensor 512 is an example of a built-in imaging device capable of capturing a subject under control of the CPU 501. The microphone 514 is an example of built-in audio collecting device capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The near-distance communication circuit 519 is a communication circuit that communicates in compliance with the Wi-Fi, NFC, Bluetooth, and the like. The touch panel 521 is an example of input device that enables the user to input a user instruction through touching a screen of the display 517.

The smart phone 5 further includes a bus line 510. Examples of the bus line 510 include an address bus and a data bus, which electrically connects the elements such as the CPU 501.

It should be noted that a recording medium such as a CD-ROM or HD storing any of the above-described programs may be distributed domestically or overseas as a program product.

<Hardware Configuration of Generic Image Capturing Device>

Next, referring to FIG. 5, a hardware configuration of the generic image capturing device 3 is described according to the embodiment. FIG. 5 illustrates the hardware configuration of the generic image capturing device 3. As illustrated in FIG. 5, the generic image capturing device 3 includes an imaging unit 301, an image processor 304, an imaging controller 305, a microphone 308, an audio processor 309, a bus 310, a CPU 311, a ROM 312, a SRAM 313, a DRAM 314, an operation unit 315, a network I/F 316, a communication circuit 317, an antenna 317a, an electronic compass 318, and a display 319. The image processor 304 and the imaging controller 305 are each connected to the CPU 311 via the bus 310.

The elements 304, 310, 311, 312, 313, 314, 315, 316, 317, 317a, and 318 of the generic image capturing device 3 are substantially similar in structure and function to the elements 104, 110, 111, 112, 113, 114, 115, 116, 117, 117a, and 118 of the special image capturing device 1 illustrated in FIG. 3, such that the description thereof is omitted.

Further, as illustrated in FIG. 5, in the imaging unit 301 of the generic image capturing device 3, a lens unit 306 having a plurality of lenses, a mechanical shutter button 307, and the imaging element 303 are disposed in this order from a side facing the outside (that is, a side to face the object to be captured).

The imaging controller 305 is substantially similar in structure and function to the imaging controller 105. The imaging controller 305 further controls operation of the lens unit 306 and the mechanical shutter button 307, according to user operation input through the operation unit 315.

The display 319 is capable of displaying an operational menu, an image being captured, or an image (such as a planar image) that has been captured, etc.

<Functional Configuration of Image Capturing System>

Figure 6:
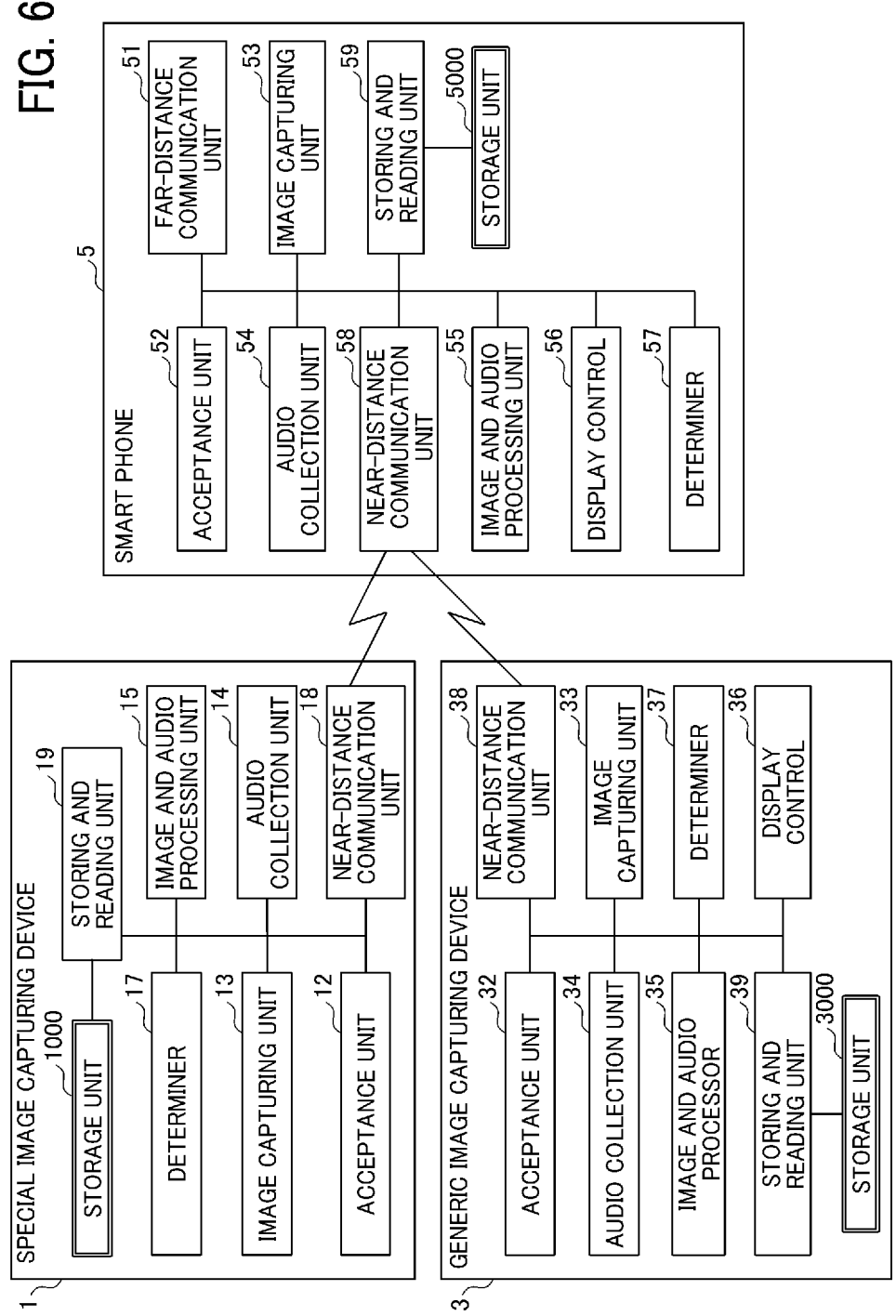
FIG. 6 is a schematic block diagram illustrating functional configurations of the special image capturing device, generic image capturing device, and smart phone, in the image capturing system, according to an embodiment.

Referring now to FIG. 6, a functional configuration of the image capturing system 100 is described according to the embodiment. FIG. 6 is a schematic block diagram illustrating functional configurations of the special image capturing device 1, generic image capturing device 3, and smart phone 5, in the image capturing system 100, according to the embodiment. In FIG. 6, the special image capturing device 1 and the generic image capturing device 3 are both shown in the same figure for the descriptive purposes. However, as described above, only one of the generic image capturing device 3 and the special image capturing device 1 may be provided.

<Functional Configuration of Special Image Capturing Device>

Figure 7:
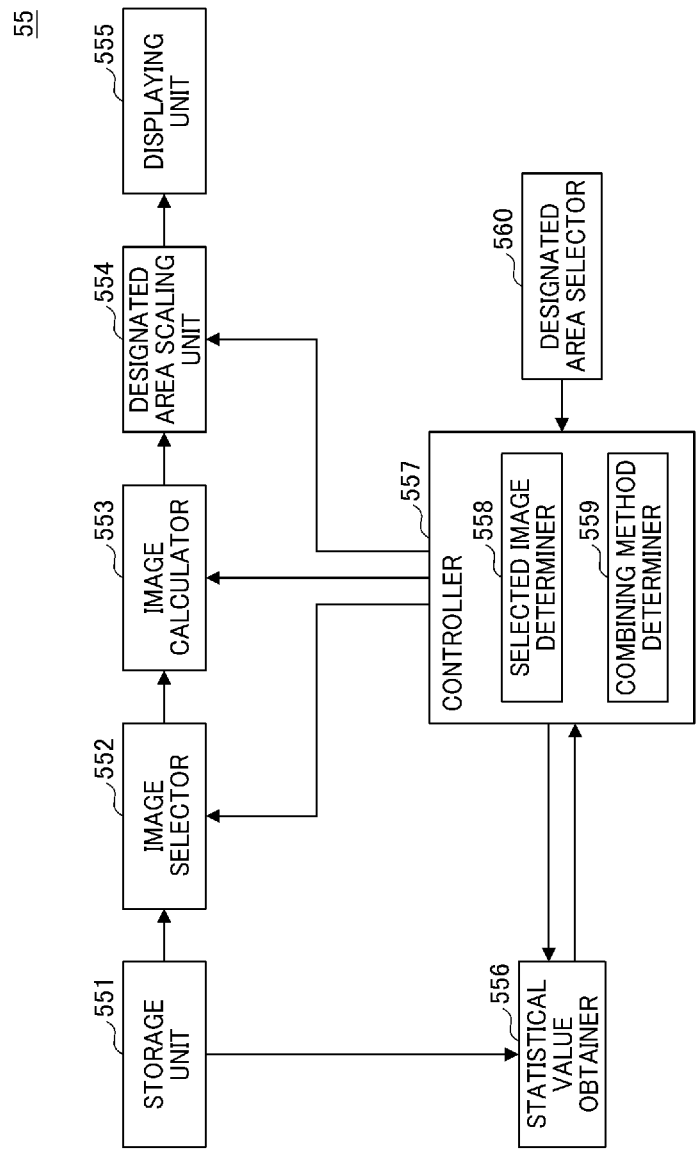
FIG. 7 is a schematic block diagram illustrating a functional configuration of an image and audio processing unit of the smart phone of FIG. 4, according to a first embodiment.

Referring to FIGS. 6 and 7, a functional configuration of the special image capturing device 1 is described according to the embodiment. As illustrated in FIG. 6, the special image capturing device 1 includes an acceptance unit 12, an image capturing unit 13, an audio collection unit 14, an image and audio processing unit 15, a determiner 17, a near-distance communication unit 18, and a storing and reading unit 19. These units are functions that are implemented by or that are caused to function by operating any of the elements illustrated in FIG. 3 in cooperation with the instructions of the CPU 111 according to the special image capturing device control program expanded from the SRAM 113 to the DRAM 114.

The special image capturing device 1 further includes a storage unit 1000, which is implemented by the ROM 112, the SRAM 113, and the DRAM 114 illustrated in FIG. 3.

The acceptance unit 12 of the special image capturing device 1 is implemented by the operation unit 115 illustrated in FIG. 3, which operates under control of the CPU 111. The acceptance unit 12 receives an instruction input from the operation unit 115 according to a user operation.

The image capturing unit 13 is implemented by the imaging unit 101, the image processor 104, and the imaging controller 105, illustrated in FIG. 3, each operating under control of the CPU 111. The image capturing unit 13 captures an image of the object or surroundings to obtain captured image data. As the captured image data, the two hemispherical images, from which the spherical image is generated, are obtained.

The audio collection unit 14 is implemented by the microphone 108 and the audio processor 109 illustrated in FIG. 3, each of which operates under control of the CPU 111. The audio collection unit 14 collects sounds around the special image capturing device 1.

The image and audio processing unit 15 is implemented by the instructions of the CPU 111, illustrated in FIG. 3. The image and audio processing unit 15 applies image processing to the captured image data obtained by the image capturing unit 13. The image and audio processing unit 15 applies audio processing to audio obtained by the audio collection unit 14. For example, the image and audio processing unit 15 generates data of the equirectangular projection image (FIG. 13C), using two hemispherical images (FIGS. 13A and 13B) respectively obtained by the imaging elements 103a and 103b.

The determiner 17, which is implemented by instructions of the CPU 111, performs various determinations.

The near-distance communication unit 18, which is implemented by instructions of the CPU 111, and the communication circuit 117 with the antenna 117a, communicates data with a near-distance communication unit 58 of the smart phone 5 using the near-distance wireless communication in compliance with such as Wi-Fi.

The storing and reading unit 19, which is implemented by instructions of the CPU 111 illustrated in FIG. 3, stores various data or information in the storage unit 1000 or reads out various data or information from the storage unit 1000.

As illustrated in FIG. 6, the smart phone 5 includes a far-distance communication unit 51, an acceptance unit 52, an image capturing unit 53, an audio collection unit 54, an image and audio processing unit 55, a display control 56, a determiner 57, the near-distance communication unit 58, and a storing and reading unit 59. These units are functions that are implemented by or that are caused to function by operating any of the hardware elements illustrated in FIG. 4 in cooperation with the instructions of the CPU 501 according to the control program for the smart phone 5, expanded from the EEPROM 504 to the RAM 503.

The smart phone 5 further includes a storage unit 5000, which is implemented by the ROM 502, RAM 503 and EEPROM 504 illustrated in FIG. 4.

The far-distance communication unit 51 of the smart phone 5 is implemented by the far-distance communication circuit 511 that operates under control of the CPU 501, illustrated in FIG. 4, to transmit or receive various data or information to or from other device (for example, the special image capturing device 1, other smart phone or server) through a communication network such as the Internet.

The acceptance unit 52 is implement by the touch panel 521, which operates under control of the CPU 501, to receive various selections or inputs from the user. While the touch panel 521 is provided separately from the display 517 in FIG. 4, the display 517 and the touch panel 521 may be integrated as one device. Further, the smart phone 5 may include any hardware key, such as a button, to receive the user instruction, in addition to the touch panel 521.

The image capturing unit 53 is implemented by the CMOS sensors 505 and 512, which operate under control of the CPU 501, illustrated in FIG. 4. The image capturing unit 13 captures an image of the object or surroundings to obtain captured image data. In this example, the captured image data is planar image data, captured with a perspective projection method.

The audio collection unit 54 is implemented by the microphone 514 that operates under control of the CPU 111, illustrated in FIG. 4. The audio collecting unit 54 collects sounds around the smart phone 5.

The image and audio processing unit 55 is implemented by the instructions of the CPU 501, illustrated in FIG. 4. The image and audio processing unit 55 applies image processing to an image of the object that has been captured by the image capturing unit 53. The image and audio processing unit 55 further applies audio processing to audio obtained by the audio collection unit 54. The image and audio processing unit 55 combines a plurality of planar images that differ in exposure (equirectangular projection images in the second embodiment), to adjust brightness of an image to be displayed.

The display control 56, which is implemented by the instructions of the CPU 501 illustrated in FIG. 4, controls the display 517 to display an image based on the captured image data that is being captured or that has been captured by the image capturing unit 53. In example operation, the display control 56 controls the display 517 to display the planar image captured by the generic image capturing device 3, or the spherical image captured by the special image capturing device 1.

The determiner 57 is implemented by the instructions of the CPU 501, illustrated in FIG. 4, to perform various determinations.

The near-distance communication unit 58, which is implemented by instructions of the CPU 501, and the near-distance communication circuit 519 with the antenna 519a, communicates data with the near-distance communication unit 18 of the special image capturing device 1, and the near-distance communication unit 38 of the generic image capturing device 3, using the near-distance wireless communication in compliance with such as Wi-Fi.

The storing and reading unit 59, which is implemented by instructions of the CPU 501 illustrated in FIG. 13, stores various data or information in the storage unit 5000 or reads out various data or information from the storage unit 5000. In this embodiment, the storing and reading unit 59 functions as an obtainer that obtains various data from the storage unit 5000.

<Functional Configuration of Generic Image Capturing Device>

As illustrated in FIG. 6, the generic image capturing device 3 includes an acceptance unit 32, an image capturing unit 33, an audio collection unit 34, an image and audio processing unit 35, a display control 36, a determiner 37, a near-distance communication unit 38, and a storing and reading unit 39. These units are functions that are implemented by or that are caused to function by operating any of the elements illustrated in FIG. 5 in cooperation with the instructions of the CPU 311 according to the image capturing device control program expanded from the SRAM 313 to the DRAM 314.

The generic image capturing device 3 further includes a storage unit 3000, which is implemented by the ROM 312, the SRAM 313, and the DRAM 314 illustrated in FIG. 5.

The acceptance unit 32 of the generic image capturing device 3 is implemented by the operation unit 315 illustrated in FIG. 5, which operates under control of the CPU 311. The acceptance unit 32 receives an instruction input from the operation unit 315 according to a user operation.

The image capturing unit 33 is implemented by the imaging unit 301, the image processor 304, and the imaging controller 305, illustrated in FIG. 5, each of which operates under control of the CPU 311. The image capturing unit 13 captures an image of the object or surroundings to obtain captured image data. In this example, the captured image data is planar image data, captured with a perspective projection method.

The audio collection unit 34 is implemented by the microphone 308 and the audio processor 309 illustrated in FIG. 5, each of which operates under control of the CPU 311. The audio collection unit 34 collects sounds around the generic image capturing device 3.

The image and audio processing unit 35 is implemented by the instructions of the CPU 311, illustrated in FIG. 5. The image and audio processing unit 35 applies image processing to the captured image data obtained by the image capturing unit 33. The image and audio processing unit 35 further applies audio processing to audio obtained by the audio collection unit 34.

The display control 36, which is implemented by the instructions of the CPU 311 illustrated in FIG. 5, controls the display 319 to display a planar image based on the captured image data that is being captured or that has been captured.

The determiner 37, which is implemented by instructions of the CPU 311, performs various determinations. For example, the determiner 37 determines whether the shutter button 315a has been pressed by the user.

The near-distance communication unit 38, which is implemented by instructions of the CPU 311, and the communication circuit 317 with the antenna 317a, communicates data with the near-distance communication unit 58 of the smart phone 5 using the near-distance wireless communication in compliance with such as Wi-Fi.

The storing and reading unit 39, which is implemented by instructions of the CPU 311 illustrated in FIG. 5, stores various data or information in the storage unit 3000 or reads out various data or information from the storage unit 3000.

<Functional configuration of Image and Audio Processing Unit>

Referring to FIG. 7, a functional configuration of the image and audio processing unit 55 of the smart phone 5 is described according to the embodiment. FIG. 7 is a block diagram illustrating the functional configuration of the image and audio processing unit 55 according to the embodiment. In the present embodiment, a process related to correction of a brightness value or a color value of a planar image captured by the generic image capturing device 3 or the smart phone 5 will be described.

The image and audio processing unit 55 includes a storage unit 551, an image selector 552, an image calculator 553, a designated area scaling unit 554, a displaying unit 555, a statistical value obtainer 556, a controller 557, and a designated area selector 560.

The generic image capturing device 3 captures a plurality of images that are taken at the same location but with different exposure conditions. The near-distance communication unit 58 of the smart phone 5 receives the plurality of images captured by the generic image capturing device 3. The storage unit 551 stores data of the plurality of images, which have been taken at the same location with different exposure conditions. For example, the storage unit 551 stores a planar image taken with an adequate exposure (correctly-exposed image), a planar image that is overexposed (overexposed image), and a planar image that is underexposed (underexposed image), respectively, for the image targeted to the same object. The storage unit 551 may preferably store information on the exposure condition, in association with each of the planar images.

The generic image capturing device 3 can be configured with various exposure settings such as program AE (Automatic Exposure), shutter speed priority AE, aperture priority AE, manual exposure, and the like. Using the program AE, the generic image capturing device 3 determines a shutter speed and an aperture in accordance with ambient brightness detected by an exposure sensor or the imaging unit 301. Using the shutter speed priority AE, the generic image capturing device 3 determines an aperture value for providing an adequate exposure for a shutter speed set by the user. Using the aperture priority AE, the special image capturing device determines a shutter speed for providing adequate exposure for the aperture value set by the user. The manual exposure allows a user to determine a shutter speed and an aperture value through manually setting. Under the exposure conditions, which can be set with any one of the above-described methods for exposure settings, the generic image capturing device 3 captures an image with an adequate exposure level, as a reference image.

Further, the generic image capturing device 3 changes one or more of the aperture value and the shutter speed, and captures one or more planar images that are underexposed, and one or more planar images that are overexposed. That is, when the aperture value is increased or the shutter speed is increased, the captured image becomes darker. When the aperture value is decreased or the shutter speed is decreased, the captured image becomes brighter.

The designated area selector 560 obtains information identifying the designated area (an example of an area to be displayed, which may also be referred to as a predetermined area), designated by user operation, and provides information on the designated area to the controller 557. Examples of such information on the designated area include a diagonal vertex of a rectangle of the designated area, and a central point and an angle of view of the designated area. In alternative to determining by the user operation, a target point may be determined in advance to determine the designated area. Alternatively, the designated area may be set to be an area covering a predetermined range from a target point. The target point may be detected through applying image processing to the captured image, for example.

The controller 557 includes a selected image determiner 558 and a combining method determiner 559. The selected image determiner 558 first determines a reference planar image (the reference image in FIG. 1). The selected image determiner 558 may determine the reference planar image, based on the exposure condition stored in the storage unit 551 in association with each planar image. Alternatively, the selected image determiner 558 may determine the reference planar image, based on the statistical value of the image data, obtained by the statistical value obtainer 556. For example, the selected image determiner 558 may select a planar image having an average brightness that falls in middle of average brightness values of all planar images stored in the storage unit 551 for the image targeted to the same object. Alternatively, the selected image determiner 558 may determine the reference planar image according to a user instruction. In the present embodiment, the selected image determiner 558 selects a planar image taken with an adequate exposure level, from among a plurality of planar images, as the reference planar image. In this example, the image with adequate exposure is an image in which a number of pixels having the value 127 (the middle of 256 levels) is greatest, in a histogram of RGB values or brightness values obtained from the RGB values. Accordingly, the reference image R may be automatically determined, which is neither an underexposed image or an overexposed image.

The selected image determiner 558 selects the underexposed planar image or the overexposed planar image, based on a comparison result between the brightness characteristic value of the designated area of the reference image R and the target brightness value.

The controller 557 notifies the statistical value obtainer 556 of information indicating which area of the planar image is designated as the designated area. The statistical value obtainer 556 obtains the statistical data of the designated area in the reference image, and sends the obtained statistical data to the controller 557. The statistical data is, for example, information on brightness (brightness values) of the designated area.

Based on the obtained statistical data, the selected image determiner 558 selects at least one planar image to be combined with the reference image. Details of the selection method will be described later. The combining method determiner 559 determines at what ratio the reference image is to be combined, and the other planar image is to be combined.

The image selector 552 selects one or more (for example, two) planar images from a plurality of planar images taken with different exposure conditions, stored in the storage unit 551, according to selection of the selected image determiner 558. The image calculator 553 combines the plurality of planar images selected by the image selector 552 at a ratio calculated by the combining method determiner 559.

The designated area scaling unit 554 enlarges or reduces a size of the designated area in the combined planar image in accordance with a display size of the displaying unit 555, and outputs an image of the designated area to the displaying unit 555. The displaying unit 555 displays the image of the designated area, which corresponds to the designated area of the planar image, on a screen of application, generated by the display control 56.

<Description of Combining Processing>

Figure 8:
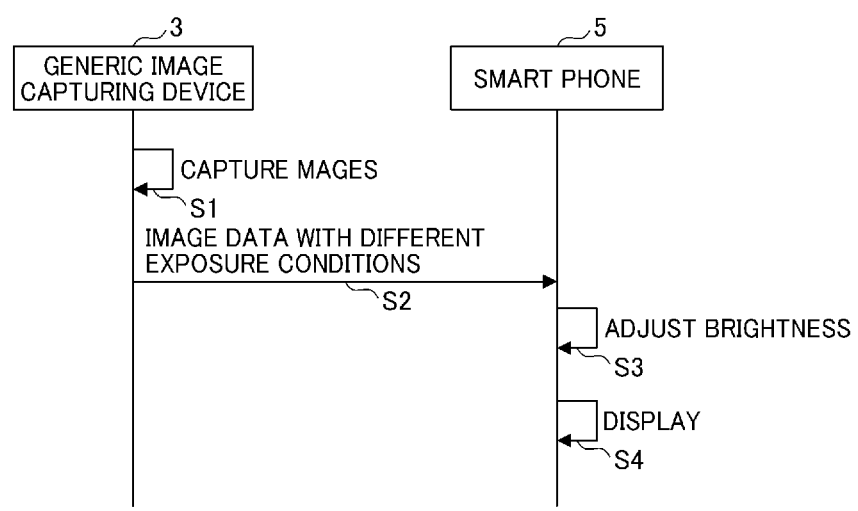
FIG. 8 is a sequence diagram illustrating overall operation performed by the image capturing system of FIG. 2A or 2C, according to the first embodiment.

FIG. 8 is a sequence diagram illustrating operation of displaying an image with adequate exposure, performed by the image capturing system 100 of FIG. 2B, according to an embodiment. At S1, the image capturing unit 33 of the generic image capturing device 3 captures three or more planar images that differ in exposure conditions. The image may be captured in response to pressing of the shutter button 315a by the user, or in response to an image capturing instruction received from the smart phone 5 that is generated according to a user operation on the smart phone 5. In either case, the generic image capturing device 3 and the smart phone 5 are communicable with each other wirelessly or by wire.

At S2, the near-distance communication unit 38 of the generic image capturing device 3 transmits the three or more planar images that differ in exposure conditions, to the smart phone 5. The generic image capturing device 3 is previously programmed to transmit the planar images to the smart phone 5. Alternatively, the generic image capturing device 3 may transmit the planar images to the smart phone 5, according to user operation.

At S3, the near-distance communication unit 58 of the smart phone 5 receives the three or more planar images that differ in exposure conditions. The image and audio processing unit 55 of the smart phone 5 adjusts brightness of an image to be displayed, using at least two of the three or more planar images that differ in exposure conditions. This process will be described referring to FIG. 9.

At S4, the display control 56 of the smart phone 5 displays, on the display 517, the planar image having the brightness value adjusted.

In the case of the image capturing system 100 having the configuration of FIG. 2C, the smart phone 5 itself captures the images at S1. Further, S2 of transmitting the planar images from the generic image capturing device 3 to the smart phone 5 is omitted.

Figure 9:
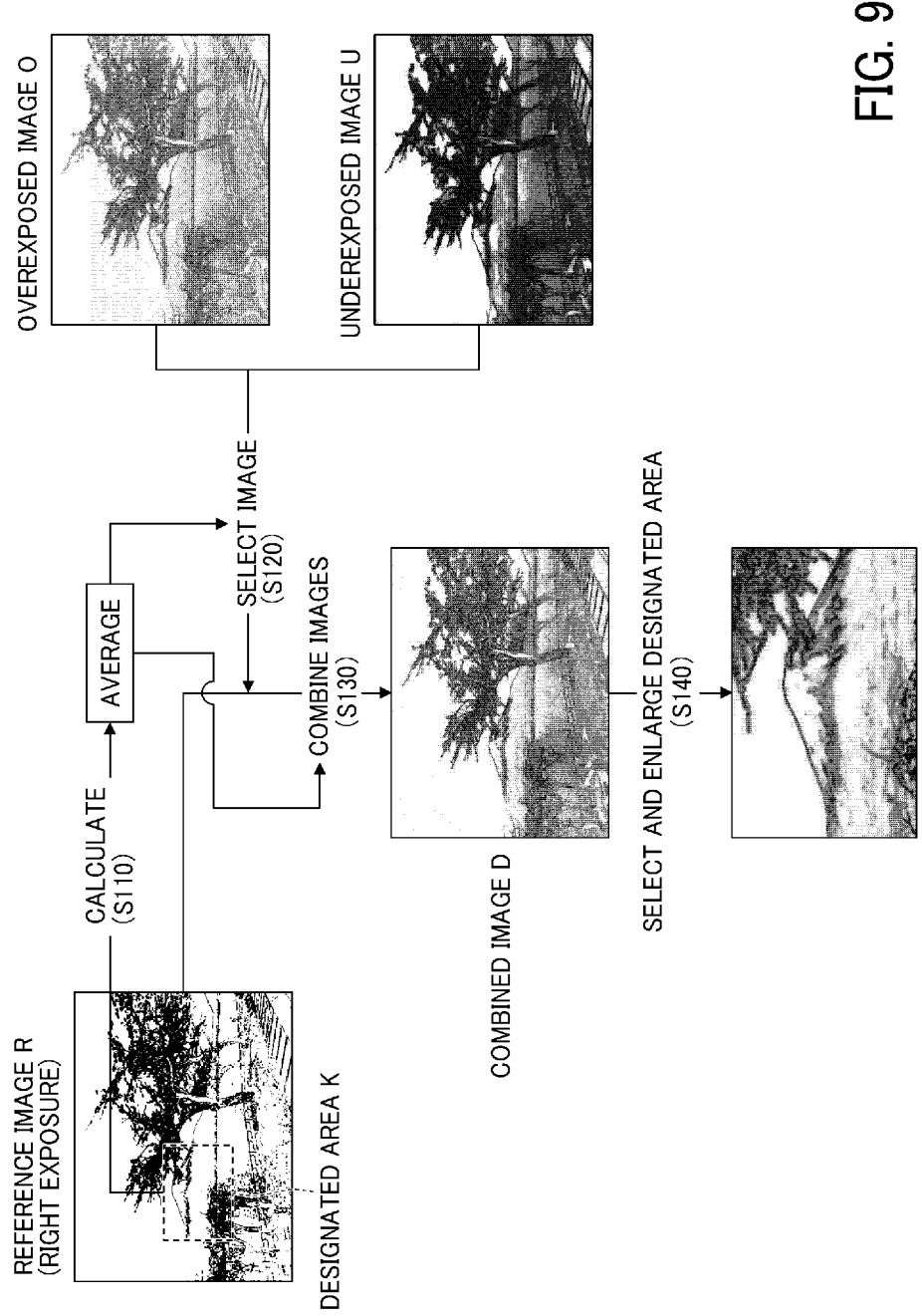
FIG. 9 is a diagram for explaining a flow of image processing performed in combining images, according to the first embodiment.

FIG. 9 is a diagram for explaining a flow of image processing performed in combining images, according to an embodiment. In FIG. 9, the reference image R is the reference planar image captured with adequate exposure. From among the plurality of planar images with different exposure conditions, the overexposed image O is the planar image that is overexposed, and the underexposed image U is the planar image that is underexposed.

Preferably, the generic image capturing device 3 captures one or more overexposed images O and one or more underexposed images U, by changing only the exposure conditions, while keeping the position and angle of view the same as those of the reference image R. The generic image capturing device 3 at least captures the overexposed image O or the underexposed image U. In FIG. 9, one overexposed image O and one underexposed image U are illustrated for one reference image R. Alternatively, two or more overexposed images O, or two or more underexposed images U may be obtained for one reference image R.

At S110, the statistical value obtainer 556 calculates an average of brightness values in the designated area K of the planar image.

Next, at S120, the selected image determiner 558 selects an image to be combined based on the average brightness value of the designated area K, calculated at S110. In this embodiment, the reference image R is previously determined. The selected image determiner 558 selects either the overexposed image O or the underexposed image U, based on brightness (brightness characteristics) of the designated area K. Details for selecting the image will be explained with reference to FIG. 10.

At S130, the image calculator 553 combines the reference image R with selected one of the overexposed image O and the underexposed image U, which is selected at S120. The entire planar images may be combined, or only the designated areas K of the planar images may be combined. Details of the combining process will be described later.

At S140, the designated area scaling unit 554 enlarges or reduces a size of the designated area K of the planar image, which is generated by combining, so as to match with a display area of the display 517.

<Image Selection>

FIG. 10 is a flowchart illustrating processing performed at S120 for determining a planar image to be combined with the reference image R, performed by the selected image determiner 558, according to an embodiment.

First, at S121, the selected image determiner 558 compares the average brightness value of the entire designated area K in the reference image R, with the target brightness value of the designated area. In this example, the target brightness value is previously determined. For example, in the case of 8-bit RGB data having 256 different color values (color levels), the target brightness value is set to the medium value of 128. More specifically, the selected image determiner 558 compares the average brightness value of the entire designated area K in the reference image R, with the value 128. In this example, the pixel value is normalized to have a value from 0 to 1, such that the target brightness value is expressed by 0.5, which is an example of threshold. Alternatively, the target brightness value may be set to the value 100 or 150 of 256 color levels.

When the average brightness value of the designated area K in the reference image R is greater than the target brightness value ("YES" at S121), operation proceeds to S122. Since the image of the designated area K in the reference image R is overexposed, at S122, the selected image determiner 558 selects the underexposed image U to be combined with the reference image R.

When the average brightness value of the designated area K in the reference image R is less than the target brightness value ("NO" at S121), operation proceeds to S123. Since the image of the designated area K in the reference image R is underexposed, at S123, the selected image determiner 558 selects the overexposed image O to be combined with the reference image R.

Here, when the average brightness value is equal to the target bright value, operation may proceed to other step of not selecting any image. In such case, no correction in brightness is performed, such that none of the overexposed image and the underexposed image is combined with the reference image. However, for simplicity, it is assumed that the embodiments described in this disclosure only illustrate the case where the average brightness value is not equal to the target brightness value.

In the above-described example, the average brightness value of the entire designated area K in the reference image R is used, as the statistical value indicating brightness of the designated area K. However, the brightness value of a part of the designated area K, such as a central part of the designated area K, may be used instead. Alternatively, any characteristic value relating to brightness may be used, such as histogram.

<Combining Planar Images>

The processing to combine planar images, performed at S130 of FIG. 9, is described according to an embodiment. At S130, the image calculator 553 combines the reference image R with selected one of the overexposed image O and the underexposed image U, which is selected at S120. It is assumed that the average brightness value of the designated area K in the reference image R is ref (ranging from 0.0 to 1.0), and the target brightness value is aim (ranging from 0.0 to 1.0). The combined value "blend" is calculated using Equation 1.

$$\text{blend}=|(\text{aim}-\text{ref})*\text{correction coefficient}|,$$
$$0.0<=\text{blend}<=1.0 \quad \text{(Equation 1)}$$

Here, "blend" is clipped to be within the range from 0.0 to 1.0. Through clipping, any value less than the lower limit 0.0 is corrected to be equal to 0.0. Any value greater than the upper limit 1.0 is corrected to be equal to 1.0.

The correction coefficient determines an amount of correction to be performed on the reference image R, to be closer to the overexposed image O or the underexposed image U in brightness value. The correction coefficient is determined according to a difference between the average brightness value of the reference image R and the target brightness value, that is, a difference between the brightness characteristics of a display area (designated area) of the reference image R and the target brightness value. The correction coefficient may be previously set, may be determined by the user based on the planar image being viewed, or may be automatically calculated from the exposure conditions at the time of image capturing. In case the correction coefficient is previously set, the correction coefficient may be set to 3.0.

In the case where the pixel value of the overexposed image O or the underexposed image U selected at S120 is "S", and the pixel value of the reference image R is "R", each pixel value D (u, v) of the combined image D is represented by the following Equation 2.

$$D(u,v)=S(u,v)\times\text{blend}+R(u,v)\times(1.0-\text{blend}) \quad \text{(Equation 2)}$$

<Case where there are a Plurality of Overexposed Images or Underexposed Images>

The following describes other example case in which there are two overexposed images and two underexposed images. This results in five planar images including the reference image R. These images respectively have exposure of −2.0, −1.0, 0.0, +1.0, and +2.0, each exposure being expressed as an EV value. The values −2.0 and −1.0 each indicate that the images are under exposed. The value +1.0 and +2.0 each indicate that the images are over exposed. The exposure of the reference planar image R, which is EV0.0, is combined with any one of the overexposed and underexposed images that range from −2.0 to +2.0 to correct exposure.

The method of obtaining the combined value "blend" may be the same as Equation 1. However, the range of values to be clipped is different.

$$0.0<=\text{blend}<=2.0 \quad \text{(Equation 3)}$$

That is, when there are a plurality of images that differ in exposure for each one of overexposed image and underexposed image, the selected image determiner 558 changes a range of clipping to switch the image to be combined according to the combined value "blend". The following describes the example case in which the reference image R is made darker. In the example case (i) where 0.0<=blend<=1.0, the correction value "adj" is equal to the combined value "blend". Here, I1 represents the image selected as a target for correction. In this case (i), the underexposed image with EV −1.0 is selected. Here, I2 represents the image to be corrected, which is the reference image R with EV 0.0 in this example. In the example case (ii) where 1.0<blend<=2.0, the correction value "adj" is equal to (combined value "blend"−1.0). Here, I1 represents the image selected as a target for correction. In this case (ii), the underexposed images with EV −2.0 is selected. Here, I2 represents the image to be corrected, which is the underexposed image with EV −1.0.

In either of the cases (i) and (ii), the combined value "blend" of the corrected image D is obtained using Equation 4.

$$D(u,v)=I1(u,v)*\text{adj}+I2(u,v)*(1.0-\text{adj}) \quad \text{(Equation 4)}$$

As described above, when the combined value "blend" is smaller than the target value (the reference image R is brighter), the selected image determiner 558 combines the reference image R, and the underexposed image that is the next darkest image than the reference image R. When the combined value "blend" is greater than the target value (the reference image R is brighter), the selected image determiner 558 combines two underexposed images each have darker values than the value of the reference image. The reference image R may be made darker by a desired amount as indicated by the combined ratio "blend", through selecting and combining two images from among the reference image R and two underexposed images.

As described above, in the above-described embodiment, when the average of the brightness values of the designated area in the reference image is less than the target brightness value for the designated area in the reference image, that is, when the image is underexposed, the overexposed image is combined with the reference image R according to the degree of underexposure. This reduces the effects in underexposure in the designated area. Accordingly, the designated area that the user is viewing has adequate exposure.

Similarly, when the average of the brightness values of the designated area in the reference image is greater than the target brightness value for the designated area in the reference image, that is, when the image is overexposed, the underexposed image is combined with the reference image R according to the degree of overexposure. This reduces the effects in overexposure in the designated area. Accordingly, the designated area that the user is viewing has adequate exposure.

Although the reference image and one or more images are combined in the above-described embodiment, a plurality of planar images other than the reference image may be combined. That is, any arbitrary planar images that differ in exposure can be combined to adjust brightness of the image to be displayed. Further, the above-described embodiment describes the case of combining still images, however, planar images to be combined may be movie images.

Further, brightness of the designated area is adjusted in this embodiment, however, brightness of the entire planar image may be adjusted. In such case, designation of the designated area is unnecessary.

Second Embodiment

The following describes operation of correcting brightness values of the entire spherical image captured by the special image capturing device 1. The following operation may be performed by the image capturing system 100 of FIG. 2B or FIG. 2C.

In this embodiment, elements that are the same as those described above in the first embodiment are assigned with the same reference numbers, and description thereof is omitted. Accordingly, elements that differ from those in the first embodiment will be mainly described below.

<Generation of Spherical Image>

Referring to FIGS. 11 to 17, a method of generating a spherical image is described.

First, referring to FIGS. 11A to 11D (FIG. 11), an external view of the special image capturing device 1 is described according to the embodiment. The special image capturing device 1 is a digital camera for capturing images from which a 360-degree full-view spherical image is generated. FIGS. 11A to 11D are respectively a left side view, a rear view, a plan view, and a bottom view of the special image capturing device 1.

Figure 11A:
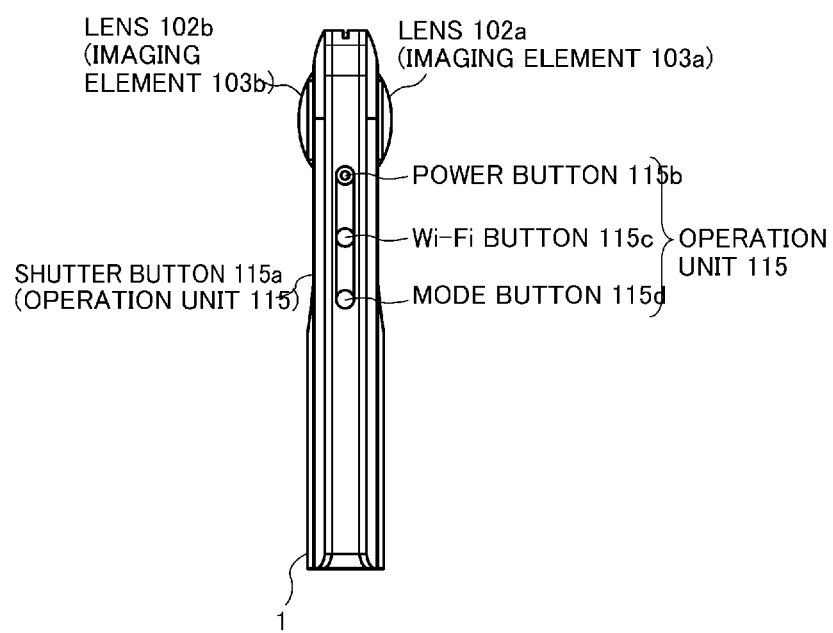
FIGS. 11A, 11B, 11C, and 11D are a left side view, a rear view, a plan view, and a bottom side view of the special image capturing device of FIG. 3, according to an embodiment.
Figure 11B:
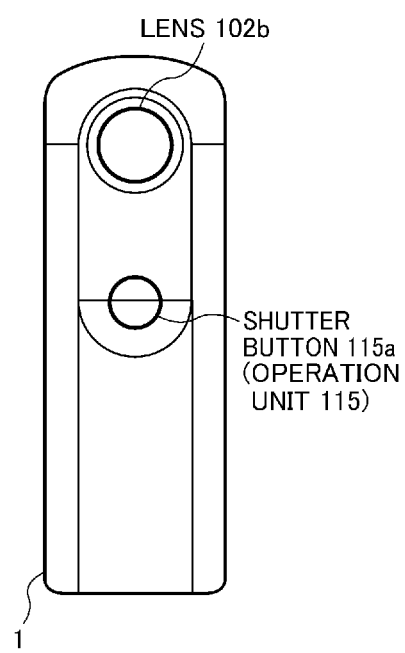
Figure 11C:
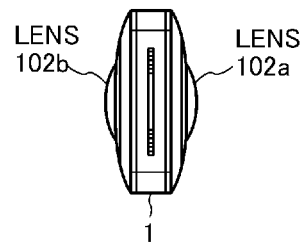
Figure 11D:
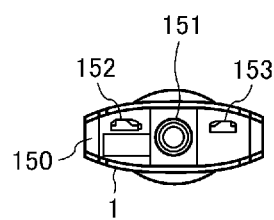

As illustrated in FIGS. 11A to 11D, the special image capturing device 1 has an upper part, which is provided with a fish-eye lens 102a on a front side (anterior side) thereof, and a fish-eye lens 102b on a back side (rear side) thereof. The special image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 11B, the special image capturing device 1 further includes a shutter button 115a on a rear side of the special image capturing device 1, which is opposite of the front side of the special image capturing device 1. As illustrated in FIG. 11A, the left side of the special image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

As illustrated in FIG. 1D, the special image capturing device 1 is provided with a tripod mount hole 151 at a center of its bottom face 150. The tripod mount hole 151 receives a screw of a tripod, when the special image capturing device 1 is mounted on the tripod. In this embodiment, the tripod mount hole 151 is where the generic image capturing device 3 is attached via an adapter. The bottom face 150 of the special image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Figure 12:
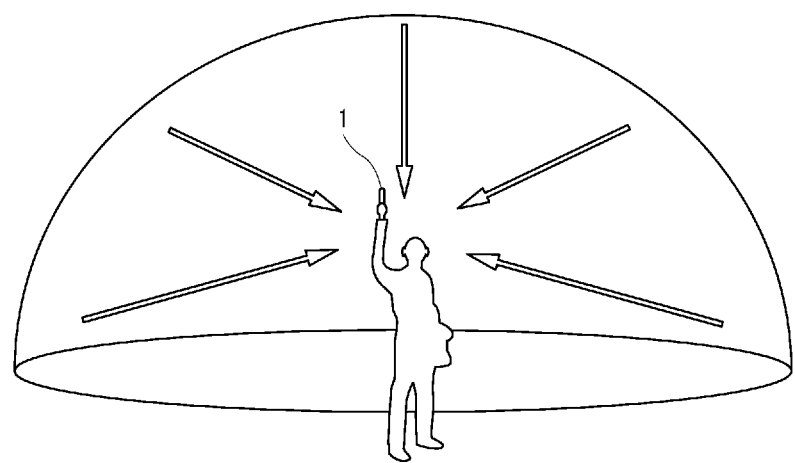
FIG. 12 is an illustration for explaining how a user uses the special image capturing device of FIG. 3, according to an embodiment.

Next, referring to FIG. 12, a description is given of a situation where the special image capturing device 1 is used. FIG. 12 illustrates an example of how the user uses the special image capturing device 1. As illustrated in FIG. 12, for example, the special image capturing device 1 is used for capturing objects surrounding the user who is holding the special image capturing device 1 in his or her hand. The imaging elements 103a and 103b illustrated in FIGS. 1A to 1D capture the objects surrounding the user to obtain two hemispherical images.

Figure 13A:
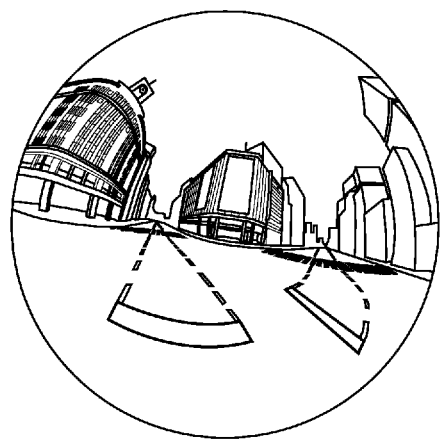
FIGS. 13A, 13B, and 13C are views illustrating a front side of a hemispherical image, a back side of the hemispherical image, and an image in equirectangular projection, respectively, captured by the special image capturing device of FIG. 3, according to an embodiment.
Figure 13B:
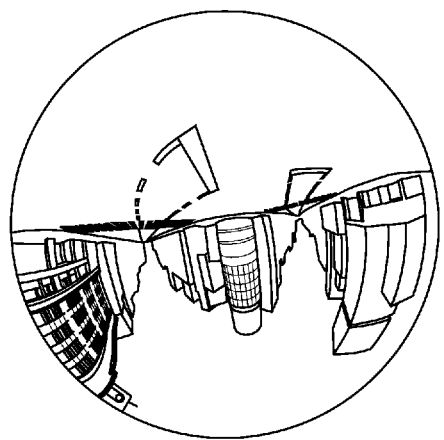
Figure 13C:
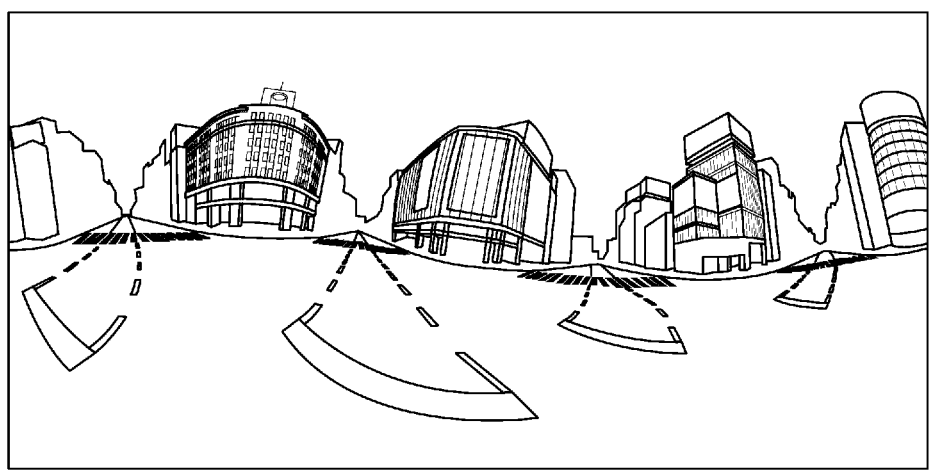
Figure 14B:
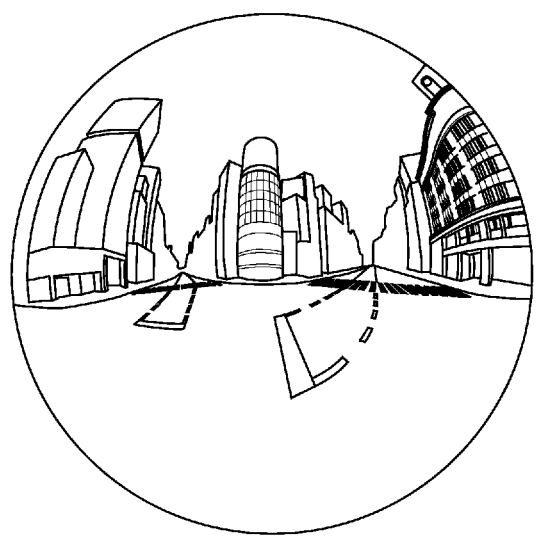

Next, referring to FIGS. 13A to 13C and FIGS. 14A and 14B, a description is given of an overview of an operation of generating an equirectangular projection image EC and a spherical image CE from the images captured by the special image capturing device 1. FIG. 13A is a view illustrating a hemispherical image (front side) captured by the special image capturing device 1. FIG. 13B is a view illustrating a hemispherical image (back side) captured by the special image capturing device 1. FIG. 13C is a view illustrating an image in equirectangular projection, which is referred to as an "equirectangular projection image" (or equidistant cylindrical projection image) EC. FIG. 14A is a conceptual diagram illustrating an example of how the equirectangular projection image maps to a surface of a sphere. FIG. 14B is a view illustrating the spherical image.

As illustrated in FIG. 13A, an image captured by the imaging element 103a is a curved hemispherical image (front side) taken through the fish-eye lens 102a. Also, as illustrated in FIG. 13B, an image captured by the imaging element 103b is a curved hemispherical image (back side) taken through the fish-eye lens 102b. The hemispherical image (front side) and the hemispherical image (back side), which are reversed by 180-degree from each other, are combined by the special image capturing device 1. This results in generation of the equirectangular projection image EC as illustrated in FIG. 13C.

The equirectangular projection image is mapped on the sphere surface using Open Graphics Library for Embedded Systems (OpenGL ES) as illustrated in FIG. 14A. This results in generation of the spherical image CE as illustrated in FIG. 14B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 14B, a part of the image may look distorted when viewed from the user, providing a feeling of strangeness. To resolve this strange feeling, an image of a predetermined area (designated area), which is a part of the spherical image CE, is displayed as a flat image having fewer curves. The predetermined area is, for example, a part of the spherical image CE that is viewable by the user. In this disclosure, the image of the predetermined area is referred to as a "predetermined-area image" Q. Hereinafter, a description is given of displaying the predetermined-area image Q with reference to FIG. 15 and FIGS. 16A and 16B.

Figure 15:
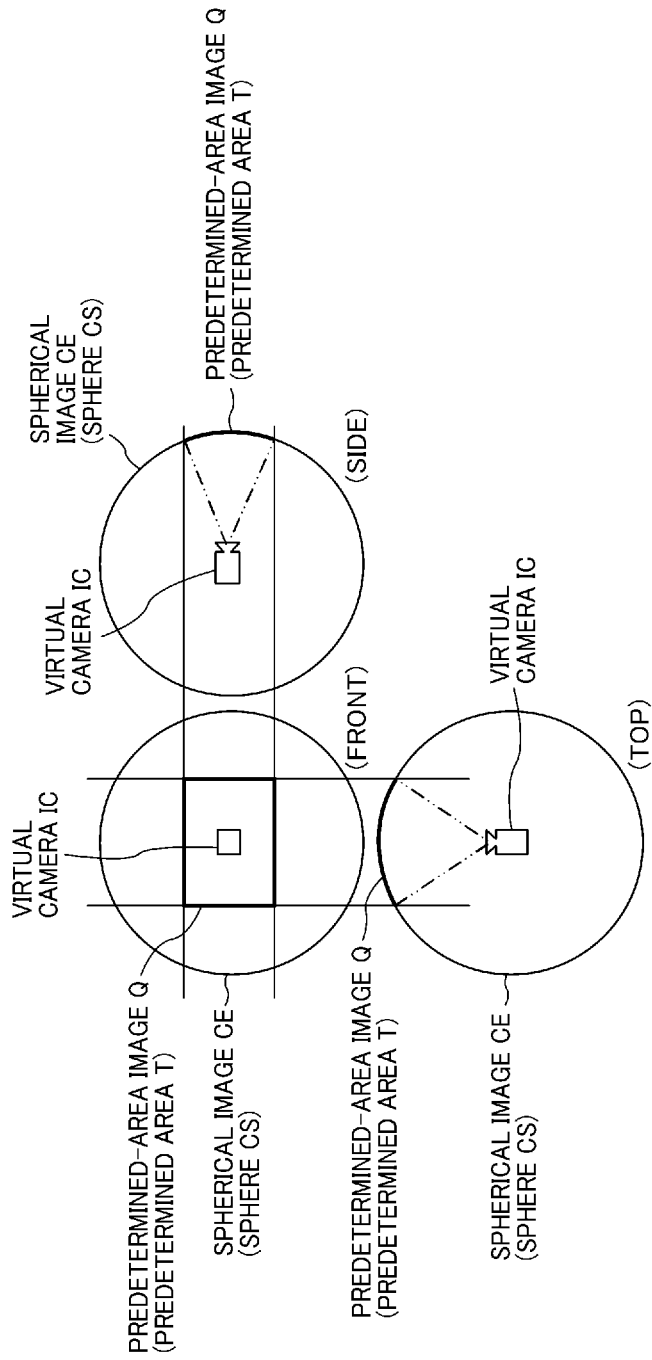
FIG. 15 is a view illustrating positions of a virtual camera and a predetermined area in a case in which the spherical image is represented as a three-dimensional solid sphere according to an embodiment.
Figure 16A:
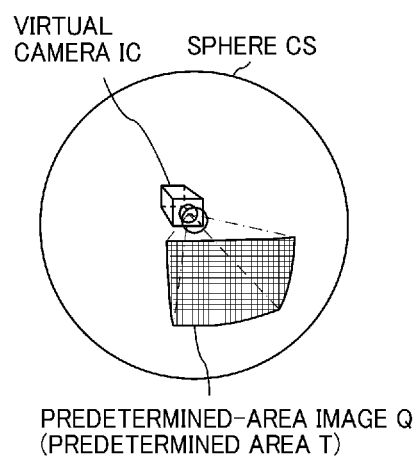
FIG. 16A is a perspective view of the spherical image illustrated in FIG. 15.
Figure 16B:
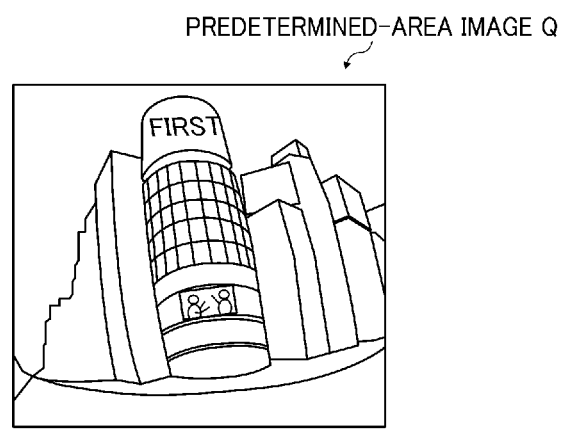
FIG. 16B is a view illustrating the predetermined-area image when displayed on a display.

FIG. 15 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 16A is a perspective view of the spherical image CE illustrated in FIG. 15. FIG. 16B is a view illustrating the predetermined-area image Q when displayed on a display. In FIG. 16A, the spherical image CE illustrated in FIG. 15B is represented as a surface area of the three-dimensional solid sphere CS. Assuming that the spherical image CE is a surface area of the solid sphere CS, the virtual camera IC is inside of the spherical image CE as illustrated in FIG. 15. The predetermined area T in the spherical image CE is an imaging area of the virtual camera IC. Specifically, the predetermined area T is specified by predetermined-area information indicating an imaging direction and an angle of view α of the virtual camera IC in a three-dimensional virtual space containing the spherical image CE. That is, the zooming of the predetermined area T is determined by expanding or contracting a range (arc) of the angle of view α. In addition, zooming in the predetermined area T can also be determined by bringing the virtual camera IC closer to or away from the spherical image CE. The predetermined-area image Q is an image of the predetermined area T, in the spherical image CE. The predetermined area T is defined by the angle of view α and a distance f from the virtual camera IC to the spherical image CE (see FIG. 17).

The predetermined-area image Q, which is an image of the predetermined area T illustrated in FIG. 16A, is displayed on a display as an image of an imaging area of the virtual camera IC, as illustrated in FIG. 16B. FIG. 16B illustrates the predetermined-area image Q represented by the predetermined-area information that is set by default. The following explains the position of the virtual camera IC, using an imaging direction (ea, aa) and an angle of view α of the virtual camera IC.

Figure 17:
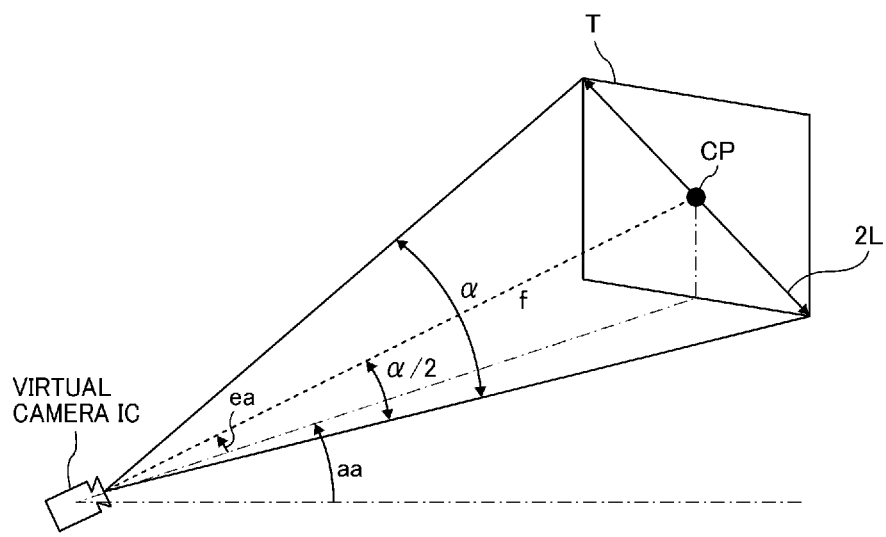
FIG. 17 is a view illustrating a relation between predetermined-area information and a predetermined-area image according to an embodiment.

Referring to FIG. 17, a relation between the predetermined-area information and the image of the predetermined area T is described according to the embodiment. FIG. 17 is a view illustrating a relation between the predetermined-area information and the image of the predetermined area T. As illustrated in FIG. 17, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. L is a distance between the center point CP and a given vertex of the predetermined area T (2L is a diagonal line). In FIG. 17, a trigonometric function equation generally expressed by the following equation 5 is satisfied.

$$L/f=\tan(\alpha/2) \qquad \text{(Equation 5)}$$

<Functional Configuration of Image and Audio Processing Unit>

Figure 18:
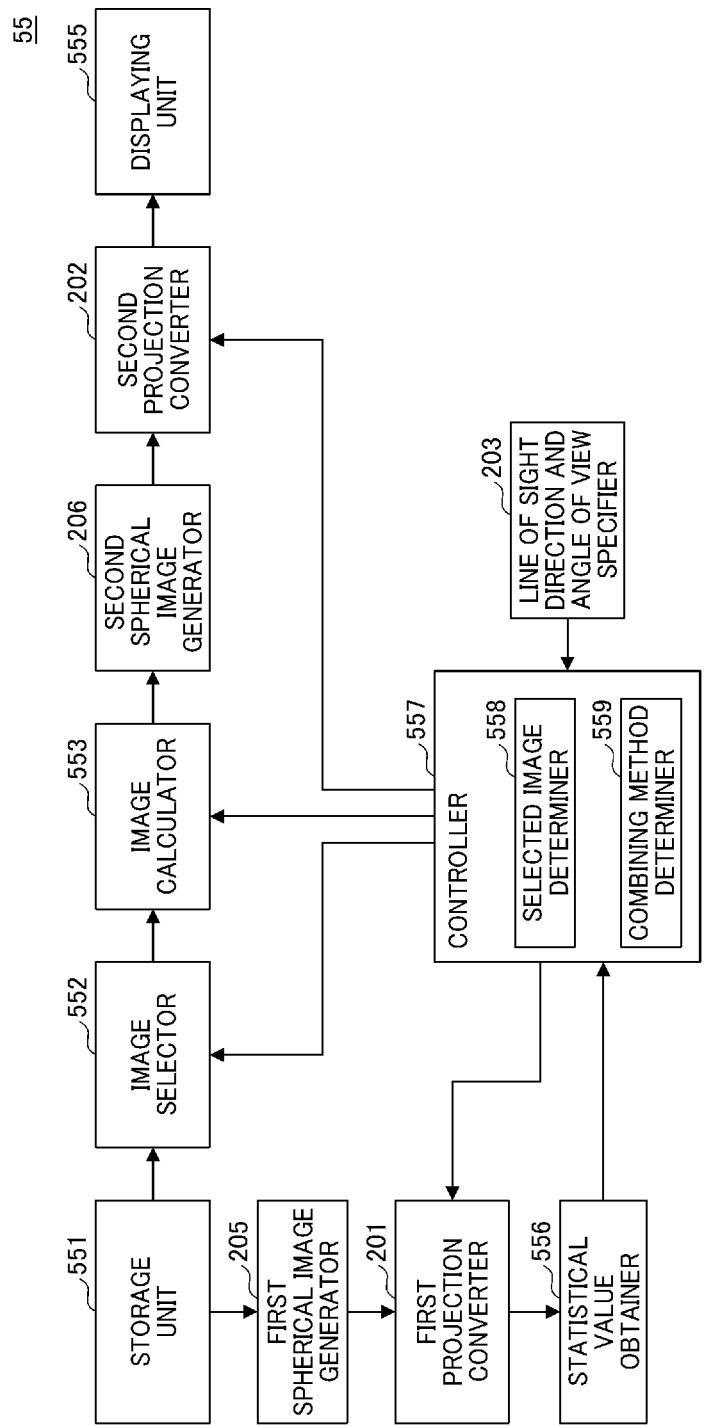
FIG. 18 is a block diagram illustrating a functional configuration of the image and audio processing unit of the special image capturing device of FIG. 3, according to a second embodiment.

FIG. 18 is a block diagram illustrating the functional configuration of the image and audio processing unit 15 of the special image capturing device 1 according to the embodiment. In FIG. 18, in order to display the spherical image on the display 517, the image and audio processing unit 15 includes a first projection converter 201 and a second projection converter 202, and a first spherical image generator 205 and a second spherical image generator 206.

The storage unit 551 stores data of a plurality of equirectangular projection images, which have been taken by the special image capturing device 1 at the same location with different exposure conditions. For example, the storage unit 551 stores an equirectangular projection image taken with an adequate exposure (correctly-exposed image), an equirectangular projection image that is overexposed (overexposed image), and an equirectangular projection image that is underexposed (underexposed image), respectively, for the image targeted to the same object. The storage unit 551 may preferably store information on the exposure condition, in association with each of the equirectangular projection images. Since there is no diaphragm, the special image capturing device 1 is provided with no aperture priority AE, but with an ISO sensitivity priority AE. Using the ISO sensitivity priority AE, the special image capturing device 1 captures an overexposed image by slowing the shutter speed, and an underexposed image by increasing the shutter speed, each with the ISO sensitivity set by the user. Using the shutter speed priority AE, the special image capturing device 1 captures an overexposed image by increasing the ISO sensitivity, and an underexposed image by lowering the ISO sensitivity, at the shutter speed set by the user.

The line of sight direction and angle of view specifier 203 obtains information identifying the designated area T (an example of a display area, which may be referred to as the predetermined area), designated by user operation, and provides information on the designated area T to the controller 557. In alternative to determining by the user operation, a target point may be determined in advance to determine the designated area. Alternatively, the designated area may be set to be an area covering a predetermined range from a target point. The target point may be detected through applying image processing to the captured image, for example.

The selected image determiner 558 first determines a reference equirectangular projection image (the reference image R). The storage unit 551 selects the equirectangular projection image that is overexposed (overexposed image), or the equirectangular projection image that is underexposed (underexposed image). The method of determining the reference image R and the method of selecting the equirectangular projection image may be the same as the method described above in the first embodiment. The controller 557 includes a selected image determiner 558 and a combining method determiner 559. The functions of the selected image determiner 558 and the combining method determiner 559 are the same as those in the first embodiment, described above referring to FIG. 7.

The controller 557 notifies the first projection converter 201 of information indicating the line of sight direction and the angle of view, which is specified in the spherical image CE. Based on the information indicating the line of sight direction and the angle of view, the first projection converter 201 converts the equirectangular projection image, which is the reference image, stored in the storage unit 551, to a predetermined-area image. The method of converting to the predetermined-area image (projection transformation) will be described later.

The statistical value obtainer 556 obtains the statistical data of the predetermined-area image that is obtained by converting, and sends the obtained statistical data to the controller 557. Based on the obtained statistical data, the selected image determiner 558 selects at least one equirectangular projection image to be combined with the reference image R. The statistical data may be obtained in a substantially similar manner as describe above in the first embodiment.

The combining method determiner 559 determines a ratio between the reference image R to be combined, and the other equirectangular projection image to be combined (that is, either the overexposed image or underexposed image). According to an instruction from the selected image determiner 558, the image selector 552 selects at least two equirectangular projection images (at least the reference image R, and one of the overexposed image and the underexposed image).

The image calculator 553 combines the plurality of equirectangular projection images selected by the image selector 552 at a ratio calculated by the combining method determiner 559.

The second spherical image generator 206 maps a combined image, obtained by combining the reference image R with the overexposed image or the underexposed image, to a surface of the sphere CS, to generate a spherical image CE.

The second projection converter 202 converts the equirectangular projection image, into a perspective projection image (predetermined-area image), with the specified line-of-sight direction and angle of view, and outputs the predetermined-area image to the displaying unit 555. The displaying unit 555 is the same in function to the displaying unit 555 in the first embodiment.

<Processing on Equirectangular Projection Image>

Figure 19:
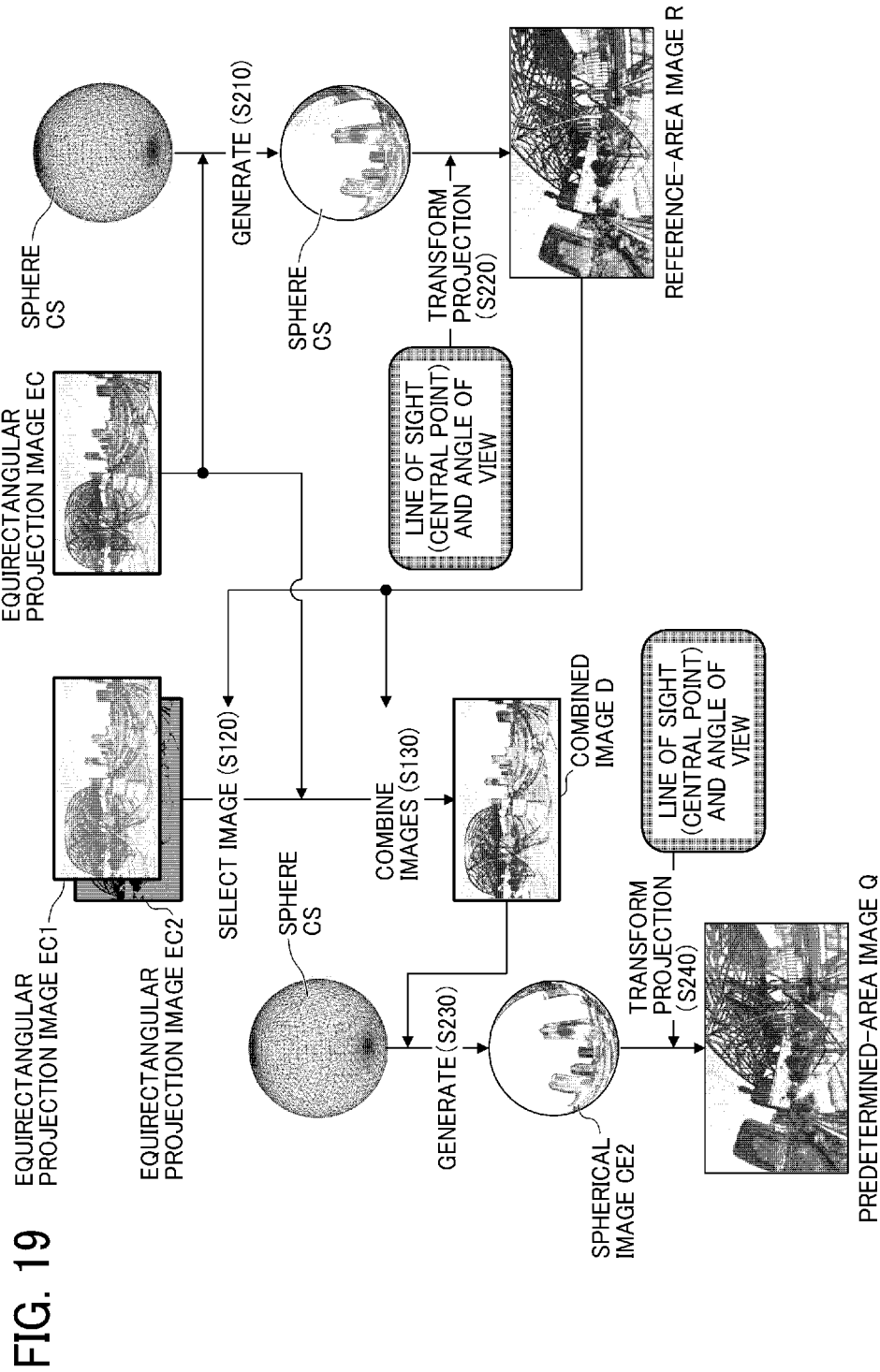
FIG. 19 is a diagram for explaining a flow of image processing performed in combining images, according to the second embodiment.

FIG. 19 is a schematic diagram illustrating the flow of processing performed on the equirectangular projection image, according to the embodiment. In FIG. 19, a plurality of equirectangular projection images EC1 and EC2 that differ in exposure are used, in addition to the equirectangular projection image EC as the reference image R. Preferably, the special image capturing device 1 captures the plurality of equirectangular projection images EC1 and EC2, at the same position when the equirectangular projection image EC is captured, while just changing exposure. As long as the image is taken at the same location, the orientation of the spherical image does not have to be the same, as the spherical image is captured.

In this embodiment, it is assumed that at least the equirectangular projection image EC1 with exposure higher than that of the equirectangular projection image EC ("overexposed image EC1"), and the equirectangular projection image EC2 with exposure lower than that of the equirectangular projection image EC ("underexposed image EC2") are obtained. In FIG. 19, one overexposed image EC1 and one underexposed image EC2 are illustrated for one reference image R. Alternatively, two or more overexposed images EC1, or two or more underexposed images EC2 may be obtained.

At S210, the first spherical image generator 205 maps the equirectangular projection image EC, which is not combined, over a surface of the sphere CS, to generate the spherical image CE.

At S220, the first projection converter 201 applies projection transformation to the spherical image CE, to display a predetermined area T defined by the line of sight direction (the central point CP of the predetermined area T) and the angle of view, specified by the line of sight direction and the angle of view specifier 203. The two-dimensional planar image thus generated is referred to as a reference-area image RA.

At S120, the selected image determiner 558 selects the overexposed image EC1 or the underexposed image EC2, which is to be combined with the equirectangular projection image EC, based on comparison between the average brightness value of the entire reference-area image RA and the target brightness value. The selection method may be the same as the selection method in the first embodiment.

At S130, the image calculator 553 combines the equirectangular projection image EC, which is the reference image, with one of the overexposed image EC1 and the underexposed image EC2 that has been selected at S120, to generate a combined equirectangular projection image D. The images may be combined in a substantially similar manner as described above in the first embodiment.

At S230, the second spherical image generator 206 maps the equirectangular projection image D, which is combined, over a surface of the sphere CS, to generate the spherical image CE1 or CE2, in a substantially similar manner as described in S210.

At S240, the second projection converter 202 applies projection transformation to the spherical image CE1 or CE2, to display a predetermined area T defined by the line of sight direction (the central point CP of the predetermined area T) and the angle of view being specified, in a substantially similar manner as described above referring to S220. Accordingly, the two-dimensional planar image, which corresponds to the predetermined area T (designated area or display area), can be generated.

The displaying unit 555 of the special image capturing device 1 transmits data of the two-dimensional planar image, as the predetermined-area image Q, to the display control 56 of the smart phone 5. Accordingly, the display 517 of the smart phone 5 displays the two-dimensional planar image, which is generated by combining the spherical image CE as the reference image with the overexposed image EC1 or the underexposed image EC2.

In FIG. 19, the equirectangular projection image EC is mapped on the sphere CS to generate the spherical image CE, and projection transformation is applied to generate the reference-area image RA. Alternatively, the reference area may be specified in the equirectangular projection image EC.

<Projection Transformation>

The following describes projection transformation. As described above referring to FIG. 19, the equirectangular projection image EC covers a surface of the sphere CS, to generate the spherical image CE. Therefore, each pixel in the equirectangular projection image EC corresponds to each pixel in the surface of the sphere CS, that is, the three-dimensional, spherical image. The first and second projection converter 201 and 202 each apply the following transformation equation. Here, the coordinate system used for the equirectangular projection image EC is expressed with (latitude, longitude)=(ea, aa), and the rectangular coordinate system used for the three-dimensional sphere CS is expressed with (x, y, z).

$$(x, y, z) = (\cos(ea) \times \cos(aa), \cos(ea) \times \sin(aa), \sin(ea)), \quad \text{(Equation 6)}$$

wherein the sphere CS has a radius of 1.

The reference-area image RA or the predetermined-area image Q in perspective projection, is a two-dimensional image. When the reference-area image RA or the predetermined-area image Q is represented by the two-dimensional polar coordinate system (moving radius, argument)=(r, a), the moving radius r, which corresponds to the diagonal angle of view α, has a value in the range from 0 to tan (diagonal angle view/2). That is, $0 <= r <= \tan(\text{diagonal angle view}/2)$. The reference-area image RA or the predetermined-area image Q, which is represented by the two-dimensional rectangular coordinate system (u, v), can be expressed using the polar coordinate system (moving radius, argument)=(r, a) using the following transformation equation 7.

$$u=r\times\cos(a), v=r\times\sin(a) \quad \text{(Equation 7)}$$

The equation 7 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 8 and 9. Here, the equirectangular projection image is represented by the above-described two-dimensional polar coordinate system (moving radius, azimuth)=(r, a), and the virtual camera IC is located at the center of the sphere.

$$r=\tan(\text{polar angle}) \quad \text{(Equation 8)}$$

$$a=\text{azimuth} \quad \text{(Equation 9)}$$

Assuming that the polar angle is t, Equation 8 can be expressed as: t=arctan(r). Accordingly, the three-dimensional polar coordinate (moving radius, polar angle, azimuth) is expressed as (1,arctan(r),a). The three-dimensional polar coordinate system is transformed into the rectangle coordinate system (x, y, z), using Equation 10.

$$(x,y,z)=(\sin(t)\times\cos(a), \sin(t)\times\sin(a), \cos(t)) \quad \text{(Equation 10)}$$

Equation 10 is applied to convert between the equirectangular projection image EC in equirectangular projection, and the reference-area image RA or the predetermined-area image Q in perspective projection. More specifically, the moving radius r, which corresponds to the diagonal angle of view α of the reference-area image RA or the predetermined-area image Q, is used to calculate transformation map coordinates, which indicate correspondence of a location of each pixel between the reference-area image RA or the predetermined-area image Q, and the equirectangular projection image EC. With this transformation map coordinates, the equirectangular projection image EC is transformed to generate the reference-area image RA or the predetermined-area image Q in perspective projection.

Through the above-described projection transformation, the coordinate (latitude=90°, longitude=0°) in the equirectangular projection image EC becomes the central point CP in the reference-area image RA or the predetermined-area image Q in perspective projection. In case of applying projection transformation to an arbitrary point in the equirectangular projection image EC as the point of gaze, the sphere CS covered with the equirectangular projection image EC is rotated such that the coordinate (latitude, longitude) of the point of gaze is positioned at (90°, 0°). The sphere CS may be rotated using any known equation for rotating the coordinate.

<Example Images>

Figure 20A:
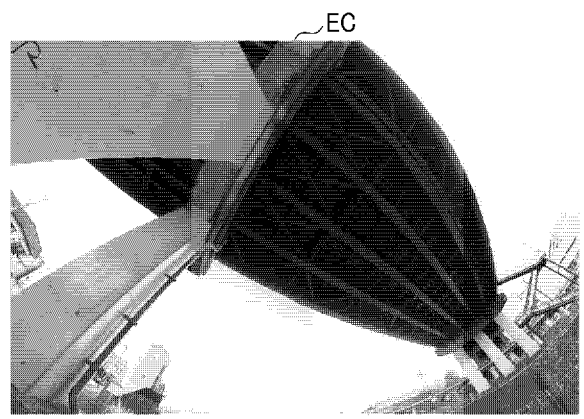
FIGS. 20A, 20B, and 20C are an illustration of example images for explaining processing to combine the equirectangular projection image of FIG. 20A as the reference image, with the underexposed equirectangular projection image of FIG. 20B into the combined image of FIG. 20C.
Figure 20B:
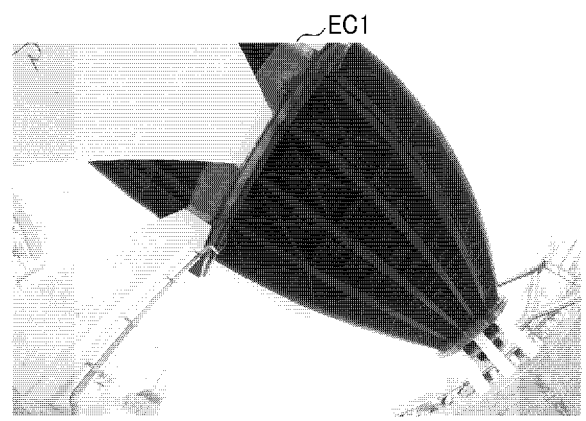
Figure 20C:
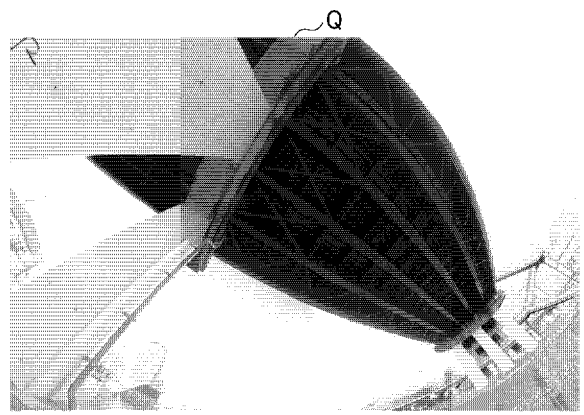

FIGS. 20A, 20B, and 20C are an illustration of example images for explaining processing to combine the equirectangular projection image as the reference image, with the underexposed equirectangular projection image.

FIG. 20A illustrates the reference-area image RA, with brightness values of the equirectangular projection image EC. The central portion of an object is darkened. FIG. 20B illustrates the overexposed image EC1, which has been captured at the same location as that of the image of FIG. 20A but with higher exposure. The central portion of the image of FIG. 20B is displayed with the adequate exposure level. FIG. 20C illustrates a predetermined-area image Q, obtained by combining the equirectangular projection image EC and the overexposed image EC1, using the combining method as described above. The predetermined area image Q has a central portion in which the darkened part becomes brighter, compared to the central portion in the image of FIG. 20A. As illustrated in FIG. 20C, underexposure of the predetermined area T, in the predetermined-area image Q, can be compensated by combining the reference image with the overexposed image EC1 according to the brightness of the reference-area image RA.

Figure 21A:
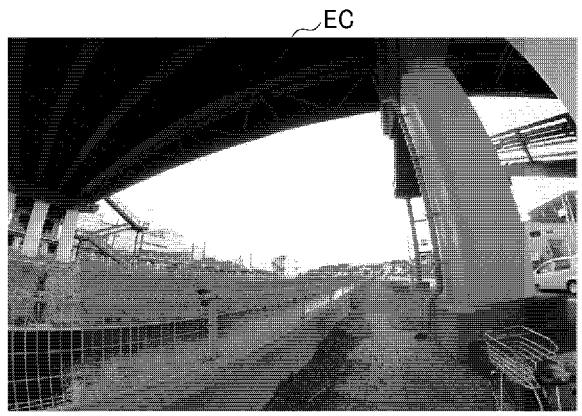
FIGS. 21A, 21B, and 21C are an illustration of example images for explaining processing to combine the spherical image of FIG. 21A as the reference image, with the overexposed spherical image into the combined image of FIG. 21C.
Figure 21B:
Figure 21C:
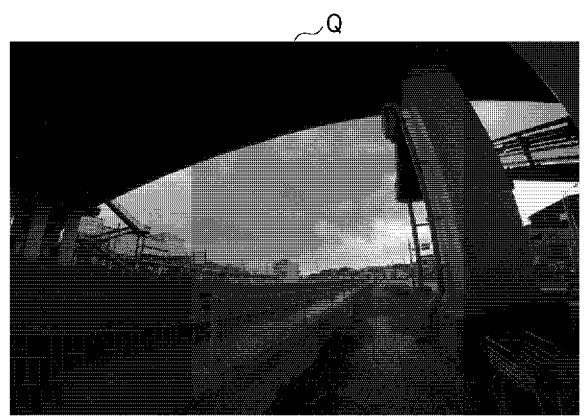

FIGS. 21A, 21B, and 21C are an illustration of example images for explaining processing to combine the spherical image as the reference image, with the overexposed spherical image.

FIG. 21A illustrates the reference-area image RA, having brightness values of the equirectangular projection image EC, similarly to the reference-area image RA illustrated in FIG. 20A. Due to the large difference in brightness between the bright part and the dark part, the central part of the reference-are image RA is displayed with white spots. FIG. 20B illustrates the underexposed image EC2, which has been captured at the same location as that of the image of FIG. 21A but with lower exposure. The central portion of the image of FIG. 21B is displayed with the adequate exposure level. FIG. 21C illustrates a predetermined-area image Q, obtained by combining the equirectangular projection image EC and the underexposed image EC2, using the combining method as described above. The predetermined area image Q has a central portion in which the white spots are removed as that portion becomes darker, compared to the central portion in the image of FIG. 21A. As illustrated in FIG. 21C, overexposure of the predetermined area T, in the predetermined-area image Q, can be compensated by combining the reference image with the underexposed image EC2 according to the brightness of the reference-area image RA.

Although the equirectangular projection image EC as the reference image and the equirectangular projection image EC1 or EC2 are combined in the above-described embodiment, a plurality of equirectangular projection images EC other than the reference image may be combined. Further, the above-described embodiment describes the case of combining still images, however, equirectangular projection images to be combined may be movie images.

For the spherical image that is captured with the special image capturing device 1, the smart phone 5 selects the underexposed image or the overexposed image according to brightness values of the reference-area image RA, defined by the line of sight direction (central angle) and the angle of view, and appropriately adjusts the exposure in the predetermined-area image Q with the selected image.

Other Application Examples

Although the best modes for carrying out the present invention have been described by way of examples, the present invention is not limited to these examples described above, and may be modified in various other ways.

For example, the smart phone 5 may transmit image data to a server via a network. In such case, the server generates an image of the designated area or a predetermined-area image, and transmits such image data to the smart phone 5 for display. In such case, some or almost all of the functions of the smart phone 5, except for capturing images, described in the first and second embodiments may be performed by the server.

Further, the functional configuration illustrated in FIG. 6, FIG. 7, and FIG. 18 and the like is not limited to those described above, as these functional blocks are illustrated in order to facilitate the understanding of processing performed by the generic image capturing device 3, the special image capturing device 1, and the smart phone 5. Accordingly, a processing unit or a specific name of the processing unit is not to limit a scope of the present invention. The processing performed by the generic image capturing device 3, the special image capturing device 1, and the smart phone 5, can also be divided into greater number of processing units according to the content of processing. Further, one processing unit may be divided further into a plurality of sub-processing units.

In one or more embodiments described above, an image processing apparatus is provided, which includes an image acquisition unit, an acceptance unit, a brightness characteristics acquisition unit, and a combining unit.

The image acquisition unit, which corresponds to the near-distance communication unit 58, may be the near-distance (short-distance) communication circuit 519, or any other communication interface circuit that receives information from the outside. The acceptance unit, which corresponds to the acceptance unit 52, may be, for example, the touch panel or any other user interface that receives user operation. The brightness characteristics acquisition unit, which corresponds to, the statistical value obtainer 556, is implemented by instructions from the CPU 501. The combining unit, which corresponds to the combining method determiner 559 and the image calculator 553, is implemented by instructions from the CPU 501. The image processing apparatus further includes a selecting unit, which corresponds to the selected image determiner 558, implemented by the instructions from the CPU 501.

The image processing apparatus may further include a projection converter, which may correspond to the first and second projection converters 201 and 202, when the image processing apparatus is implemented as the special image capturing device 1. In one example, the first and second projection converters 201 and 202 may be implemented by the instructions from the CPU 501.

The image processing apparatus may further include a displaying unit, which may correspond to a displaying unit 555. In one example, the displaying unit 555 may be implemented by the CPU 501 that operates in cooperation with the display 517.

The smart phone 5 is an example of an image processing apparatus capable of processing images being captured. The smart phone 5 may be provided with a built-in display, or may display the image on an external display. Various processing performed by the smart phone 5 are an example of image processing to be performed by the image processing apparatus. Other examples of the image processing apparatus include, but not limited to, a tablet personal computer (PC), a note PC, and a desktop PC.

In this disclosure, any image, if desired, can be made up of multiple pieces of image data which have been captured through different lenses, or using different image sensors, or at different times.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium such as a recording medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

This patent application is based on and claims priority pursuant to 35 U.S.C. § 119(a) to Japanese Patent Application No. 2017-208676, filed on Oct. 27, 2017, in the Japan Patent Office, the entire disclosure of which is hereby incorporated by reference herein.

REFERENCE SIGNS LIST

1 Special-purpose (special) image capturing device
2 General-purpose (generic) image capturing device
5 Smart phone
100 Image capturing system

The invention claimed is:

1. An image processing apparatus, comprising:
processing circuitry configured to
obtain a plurality of images, including a first image, a second image, and a third image, that have been captured under different exposure conditions;
receive designation of an area in the first image, the first image being one of the plurality of images;
obtain a brightness characteristic value of the designated area in the first image;
select, based on the obtained brightness characteristic value of the designated area, one of the second image and the third image to be a combining image;
determine a combining condition used for combining the first image and a second the combining image according to based on the obtained brightness characteristic value, the second image being any one of the plurality of images other than the first image; and
combine the first image and the second combining image based on the determined combining condition to correct brightness of the designated area for display of the first image,
wherein the processing circuitry is further configured to select the one of the second image and the third image, from the plurality of images that have been captured under the different exposure conditions, based on a comparison between the obtained brightness characteristic value of the designated area in the first image and a threshold,
wherein, when the brightness characteristic value is greater than the threshold, the processing circuitry is further configured to select, as the second combining image, one of the second image and the third image having an exposure level lower than an exposure level of the first image, and wherein, when the brightness characteristic value is less than the threshold, the processing circuitry is further configured to select, as the second combining image, one of the second image and the third image having an exposure level higher than the exposure level of the first image.

2. The image processing apparatus of claim 1, wherein the processing circuitry is further configured to determine the combining condition based on a difference between the brightness characteristic value of the designated area in the first image and the threshold.

3. The image processing apparatus of claim 1, wherein the combining condition indicates a ratio weight indicating how much of the first image is combined, and how much of the second image is combined.

4. The image processing apparatus of claim 1,
wherein the processing circuitry is further configured to select the first image based on information related to brightness of the plurality of images that have been captured under the different exposure conditions.

5. The image processing apparatus of claim 1,
wherein the plurality of images that have been captured under the different exposure conditions are each a spherical image, and
wherein the processing circuitry is further configured to receive designation of a line of sight direction and an angle of view with respect to the first image, as designation of the area in the first image,
apply projection transformation to the first image having the designated area defined by the line of sight direction and the angle of view, to generate a reference-area image corresponding to the designated area,
in obtaining the brightness characteristic value of the designated area, obtain a brightness characteristic value of the reference-area image, and
determine the combining condition for combining the first image and the second image, according to the brightness characteristic value of the reference-area image.

6. The image processing apparatus of claim 1, wherein the plurality of images that have been captured under the different exposure conditions are each a planar image.

7. The image processing apparatus of claim 1, further comprising:
a display to display an area in the combined image corresponding to the designated area in the first image.

8. An imaging system, comprising:
the image processing apparatus of claim 1; and
an image capturing system configured to capture the plurality of images under the different exposure conditions.

9. An image processing method, comprising:
obtaining a plurality of images, including a first image, a second image, and a third image, that have been captured under different exposure conditions;
receiving designation of an area in the first image, the first image being one of the plurality of images;
obtaining a brightness characteristic value of the designated area in the first image;
selecting, based on the obtained brightness characteristic value of the designated area, one of the second image and the third image to be a combining image;
determining a combining condition used for combining the first image and a second the combining image according to based on the obtained brightness characteristic value, the second image being any one of the plurality of images other than the first image; and
combining the first image and the second combining image based on the determined combining condition to correct brightness of the designated area for display of the first image,
wherein the method further comprises:
selecting the one of the second image and the third image, from the plurality of images that have been captured under the different exposure conditions, based on a comparison between the obtained brightness characteristic value of the designated area in the first image and a threshold,
wherein, when the brightness characteristic value is greater than the threshold, the method further includes selecting, as the second combining image, one of the second image and the third image having an exposure level lower than an exposure level of the first image, and
wherein, when the brightness characteristic value is less than the threshold, the method further includes selecting, as the second combining image, one of the second image and the third image having an exposure level higher than the exposure level of the first image.

10. A non-transitory recording medium carrying computer readable code for controlling a computer to perform the method of claim 9.

11. The image processing apparatus of claim 1, wherein the processing circuitry is further configured to obtain an average brightness of the designated area as the brightness characteristic value.

12. An image processing apparatus, comprising:
processing circuitry configured to
obtain a plurality of images, including a first image, a second image, and a third image, that have been captured under different exposure conditions;
receive designation of an area in the first image;
obtain a brightness characteristic value of the designated area in the first image;
select, based on the obtained brightness characteristic value of the designated area, one of the second image and the third image to be a combining image; and
combine the first image and the combining image to correct brightness of the designated area of the first image,
wherein the processing circuitry is further configured to select the one of the second image and the third image, from the plurality of images that have been captured under the different exposure conditions, based on a comparison between the obtained brightness characteristic value of the designated area in the first image and a threshold,
wherein, when the brightness characteristic value is greater than the threshold, the processing circuitry is further configured to select, as the second combining image, one of the second image and the third image having an exposure level lower than an exposure level of the first image, and
wherein, when the brightness characteristic value is less than the threshold, the processing circuitry is further configured to select, as the second combining image, one of the second image and the third image having an exposure level higher than the exposure level of the first image.

13. The image processing apparatus of claim 1, wherein the circuitry is further configured to receive the designation of the area, which is a partial region of the first image.

* * * * *